United States Patent
Zeng et al.

(10) Patent No.: US 12,386,671 B2
(45) Date of Patent: Aug. 12, 2025

(54) RESOURCE ALLOCATION METHOD AND RESOURCE BORROWING METHOD

(71) Applicant: HUAWEI TECHNOLOGIES CO., LTD., Guangdong (CN)

(72) Inventors: Yan Zeng, Shenzhen (CN); Hui Jiang, Beijing (CN); Jizhong Li, Shenzhen (CN); Min Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 723 days.

(21) Appl. No.: 17/588,983

(22) Filed: Jan. 31, 2022

(65) Prior Publication Data
US 2022/0156115 A1 May 19, 2022

Related U.S. Application Data

(63) Continuation of application No. PCT/CN2020/105476, filed on Jul. 29, 2020.

(30) Foreign Application Priority Data

Jul. 31, 2019 (CN) .......................... 201910704756.7

(51) Int. Cl.
*G06F 9/50* (2006.01)
*G06F 9/48* (2006.01)

(52) U.S. Cl.
CPC ............ *G06F 9/505* (2013.01); *G06F 9/4881* (2013.01)

(58) Field of Classification Search
USPC ....................................................... 718/104
See application file for complete search history.

(56) References Cited

U.S. PATENT DOCUMENTS 5,612,865 A 3/1997 Dasgupta
7,623,460 B2 * 11/2009 Miyazaki ................ H04L 47/11
370/254

(Continued)

FOREIGN PATENT DOCUMENTS

CN 102130938 A 7/2011
CN 104461740 A 3/2015

(Continued)

OTHER PUBLICATIONS

Chae et al., "DynaMix: Dynamic Mobile Device Integration for Efficient Cross-device Resource Sharing," 2018 USENIX Annual Technical Conference (UNSENIX ATC '18) Jul. 2018, 14 pages.

(Continued)

*Primary Examiner* — William L Bashore
*Assistant Examiner* — Koorosh Nehchiri
(74) *Attorney, Agent, or Firm* — Fish & Richardson P.C.

(57) ABSTRACT

Embodiments of this application provide example resource allocation methods. One example method includes determining, by a first node, a hash value corresponding to a first cluster. The first node can obtain a hash ring, where the hash ring includes at least one hash value interval, and each hash value interval corresponds to one second cluster. The first node can determine a target second cluster based on the hash value corresponding to the first cluster, where the hash value corresponding to the first cluster belongs to a target hash interval, the target hash interval is a hash value interval in the at least one hash value interval, and the target hash interval corresponds to the target second cluster. The first node can establish an association relationship between the first cluster and a target second cluster, where the target second cluster is allowed to apply for a resource from the first cluster.

17 Claims, 15 Drawing Sheets

(56) References Cited

U.S. PATENT DOCUMENTS

| | | | |
|---|---|---|---|
| 8,484,354 B2 | 7/2013 | Schlack | |
| 8,949,308 B2* | 2/2015 | Chintalapati | G06F 9/5072 |
| | | | 709/224 |
| 10,346,191 B2* | 7/2019 | Krishnan | G06F 9/5077 |
| 10,924,535 B2* | 2/2021 | Du | H04L 67/1008 |
| 11,023,145 B2* | 6/2021 | Danilov | G06F 3/0619 |
| 11,294,601 B2* | 4/2022 | Hao | G06F 3/061 |
| 2005/0114862 A1 | 5/2005 | Bisdikian et al. | |
| 2009/0172139 A1 | 7/2009 | Wong et al. | |
| 2011/0153826 A1 | 6/2011 | Ananthanarayanan et al. | |
| 2012/0233251 A1* | 9/2012 | Holt | G06F 16/27 |
| | | | 709/204 |
| 2014/0325182 A1* | 10/2014 | Varakur | G06F 11/0709 |
| | | | 712/30 |
| 2016/0088072 A1* | 3/2016 | Likhtarov | H04L 67/1008 |
| | | | 709/226 |
| 2016/0105323 A1* | 4/2016 | Haeupler | H04L 67/1072 |
| | | | 709/224 |
| 2016/0350226 A1* | 12/2016 | Agarwal | G06F 12/0864 |
| 2016/0378846 A1* | 12/2016 | Luse | G06F 16/122 |
| | | | 707/740 |
| 2017/0070567 A1 | 3/2017 | Lee | |

FOREIGN PATENT DOCUMENTS

| | | | |
|---|---|---|---|
| CN | 106991008 A | 7/2017 | |
| CN | 107197035 A | 9/2017 | |
| CN | 107801086 A | 3/2018 | |
| CN | 108132830 A | 6/2018 | |
| CN | 108173937 A | 6/2018 | |
| CN | 109040212 A | 12/2018 | |
| CN | 109347917 A | 2/2019 | |
| CN | 110071978 B * | 4/2022 | H04L 43/10 |
| CN | 110489059 B * | 4/2022 | G06F 3/0626 |
| EP | 3739845 B1 * | 11/2023 | G06F 16/27 |
| GB | 2417580 A | 3/2006 | |
| JP | 2007325235 A | 12/2007 | |
| WO | 2020238989 A1 | 12/2020 | |

OTHER PUBLICATIONS

Ko et al., "Computation Offloading for Energy Efficiency of Smart Devices," ACM International Joint Conference on Pervasive and Ubiquitous Computing and Proceedings of the 2017 ACM International Symposium on Wearable Computers, Sep. 2017, 4 pages.

Oh et al., "Mobile Plus: Multi-device Mobile Platform for Cross-device Functionality Sharing," 15th Annual International Conference on Mobile Systems, Applications, and Services, Jun. 2017, 13 pages.

PCT International Search Report and Written Opinion issued in International Application No. PCT/CN2020/105476 on Oct. 28, 2020, 16 pages (with English translation).

Preti et al., "Interaction Modality Mapping Service for devices in a P2P network," 2014 Workshop on Distributed User Interfaces and Multimodal Interaction (DUI '14), Jul. 2014, 4 pages.

King et al., "Enabling Edge Devices that Learn from Each Other: Cross Modal Training for Activity Recognition," 1st International Workshop on Edge Systems, Analytics and Networking (EdgeSys '18), Jun. 2018, 6 pages.

Yu et al., "Decentralized and Optimal Resource Cooperation in Geo-Distributed Mobile Cloud Computing," IEEE Transactions on Emerging Topics in Computing, Sep. 2015, 13 pages.

Extended European Search Report in European Appln No. 20846626.8, dated Nov. 9, 2022, 10 pages.

* cited by examiner

RESOURCE ALLOCATION METHOD AND RESOURCE BORROWING METHOD

CROSS-REFERENCE TO RELATED APPLICATIONS

This application is a continuation of International Application PCT/CN2020/105476, filed on Jul. 29, 2020, which claims priority to Chinese Patent Application No. 201910704756.7, filed on Jul. 31, 2019. The disclosures of the aforementioned applications are hereby incorporated by reference in their entireties.

TECHNICAL FIELD

This application relates to the field of distributed systems, and in particular, to a resource allocation method and a resource borrowing method.

BACKGROUND

With development of artificial intelligence (AI) and an internet of things (IoT), many emerging compute-intensive and delay-sensitive terminal applications, such as virtual reality (VR), augmented reality (AR), and high-definition video and image processing, are rapidly emerging, and application requirements for low delay, high bandwidth, and strong computing are increasing. A cloud computing technology is affected by factors such as a network link capacity limitation, may likely cause problems such as an excessively slow data transmission rate and an excessively high response delay, and therefore cannot meet an application service requirement. Using an edge device close to a data source to perform computing to improve service response performance gradually becomes a trend. However, a single edge device has a small computing capability, and it is difficult to meet a requirement of a large-scale task by using only the single edge device to execute a task. Therefore, computing capabilities of a plurality of edge devices are combined for use, and the plurality of edge devices perform resource sharing and mutual assistance to cooperatively complete data processing of a complex task, and this effectively ensures quality of service.

There are mainly two types of resource mutual assistance scenarios between devices. One type is hierarchical resource mutual assistance between heterogeneous devices, for example, cooperation of devices with different computing capabilities between an edge device and an edge server and between the edge device and a cloud processor. The other type is resource cooperation between devices at a same layer. To be specific, when resources of an edge device are insufficient, the edge device may borrow resources from another edge device.

In the prior art, when a busy cluster with insufficient resources needs to borrow resources from another idle cluster, a master node in the busy cluster needs to send a resource query request to a randomly selected idle cluster, and after receiving a response, the busy cluster borrows resources. When a plurality of busy clusters concurrently borrow resources from a same idle cluster, a borrowing conflict occurs.

SUMMARY

Embodiments of this application provide a resource allocation method and a resource borrowing method, to avoid a borrowing conflict that occurs because a plurality of busy clusters concurrently borrow resources from a same idle cluster.

According to a first aspect, this application provides a resource allocation method, including:

A first node determines a hash value corresponding to a first cluster; the first node obtains a hash ring, where the hash ring includes at least one hash value interval, and each hash value interval corresponds to one second cluster; the first node determines a corresponding target second cluster based on the hash value corresponding to the first cluster, where the hash value corresponding to the first cluster belongs to a target hash interval, the target hash interval is a hash value interval in the at least one hash value interval, and the target hash interval corresponds to the target second cluster; and the first node establishes an association relationship between the first cluster and the target second cluster, where the target second cluster that has the association relationship with the first cluster is allowed to apply for a resource from the first cluster. In addition, because a correspondence for resource borrowing is determined based on a correspondence that is on the hash ring generated based on the second cluster and that is of the hash value of the first cluster, and the correspondence for resource borrowing is unique, a resource of the first cluster can be borrowed by only a corresponding second cluster on the hash ring. Therefore, there is no borrowing conflict caused by concurrent borrowing of resources from a plurality of clusters to a same cluster.

In this way, the first node may determine, based on distribution, on the hash ring (generated based on a hash value corresponding to the second cluster), of the hash value corresponding to the first cluster, the target second cluster corresponding to the first cluster, and establish the association relationship between the target second cluster and the first cluster. Distribution of the hash value corresponding to the first cluster and a hash node corresponding to the second cluster on the hash ring that is according to a consistent hash algorithm is determined, and each cluster is allowed to be borrowed only by a fixed cluster. Therefore, when the target second cluster needs to borrow an idle resource of the first cluster, the target second cluster does not need to randomly send a resource query request to a cluster to borrow the resource after receiving a response, and can directly borrow a resource from a specific first cluster. This reduces delay overheads of one round-trip information.

In an optional design of the first aspect, the first cluster is an idle cluster including a plurality of idle nodes, and the second cluster is a busy cluster including a plurality of busy nodes. The idle nodes and the busy nodes are distinguished based on load of the nodes. For example, a node whose load is higher than a specific threshold is a busy node, a node whose load is not higher than the specified threshold is an idle node.

In an optional design of the first aspect, the first cluster is a fat cluster including a plurality of fat nodes, and the second cluster is a thin cluster including a plurality of thin nodes. The fat nodes and the thin nodes are distinguished based on resources or capabilities of the nodes. For example, a node with limited resources or weak capabilities is a thin node, and a node with rich resources and strong processing capabilities is a fat node. In an optional design of the first aspect, the hash ring includes a first hash node and a second hash node, the first hash node corresponds to the target second cluster, the first hash node is an adjacent successor node of the second hash node on the hash ring, and the target hash interval is a hash interval between a hash value of the first hash node and a hash value of the second hash node.

In an optional design of the first aspect, the method further includes: The first node divides an idle cluster including a plurality of computing nodes, to obtain a plurality of sub-clusters, where the first cluster is one of the plurality of sub-clusters.

In an optional design of the first aspect, the plurality of sub-clusters include a third sub-cluster and a fourth sub-cluster, the third sub-cluster is a sub-cluster having a maximum idle resource amount in the plurality of sub-clusters, the fourth sub-cluster is a cluster having a minimum idle resource amount in the plurality of sub-clusters, and an absolute value of a difference between the idle resource amount of the third sub-cluster and the idle resource amount of the fourth sub-cluster is less than a first threshold. In this way, the first node may divide the plurality of computing nodes in the idle cluster, so that a difference between idle resource amounts of first clusters in the plurality of sub-clusters obtained through division is not excessively large.

In an optional design of the first aspect, an absolute value of a difference between an idle resource amount of each of the plurality of sub-clusters and a preset idle resource amount is less than or equal to a second threshold, and the preset idle resource amount is related to a historical requested resource amount. In this way, the first node divides the plurality of computing nodes in the idle cluster based on a historical resource request, so that the idle resource amount of each of the plurality of sub-clusters obtained through division is close to the historical requested resource amount.

In an optional design of the first aspect, a quantity of the plurality of sub-clusters and a quantity of second clusters are less than a third threshold.

In an optional design of the first aspect, the method further includes: The first node receives a first resource borrowing request sent by the target second cluster, where the first resource borrowing request includes task data and an identifier of the first cluster; and the first node sends the task data to the first cluster based on the identifier of the first cluster.

In an optional design of the first aspect, the method further includes: The first node receives a first resource borrowing request sent by the target second cluster, where the first resource borrowing request includes task data; and the first node sends the task data to the first cluster.

In an optional design of the first aspect, that the first node sends the task data to the first cluster includes: The first node sends the task data to the first cluster based on the association relationship between the first cluster and the target second cluster.

In an optional design of the first aspect, the hash ring includes Y hash nodes, and each second cluster corresponds to at least one hash node, hash values corresponding to the Y hash nodes and the hash value corresponding to the first cluster are generated according to a same hash algorithm, and Y is a positive integer. In this way, the hash value corresponding to the hash node on the hash ring and the hash value corresponding to the first cluster are generated according to the same hash algorithm, so that a case in which the hash value corresponding to the first cluster overlaps the hash node on the hash ring does not occur.

In an optional design of the first aspect, the method further includes: The first node determines Y hash values corresponding to X second clusters, where each second cluster corresponds to at least one hash value, X is a positive integer, and Y is a positive integer greater than or equal to X; and the first node generates the hash ring based on the Y hash values, where the hash ring includes the Y hash nodes, each second cluster corresponds to the at least one hash node, the Y hash nodes divide the hash ring into Y hash value intervals, and each hash node corresponds to one hash value interval. In this way, the hash ring may be generated by the first node.

In an optional design of the first aspect, the method further includes: The first node receives the hash ring sent by the second cluster.

In an optional design of the first aspect, the method further includes: The first node sends an idle resource amount of the first cluster to the target second cluster.

According to a second aspect, this application provides a resource borrowing method, where the method includes: A second node determines a first cluster that has an association relationship with a target second cluster, where the second node belongs to the target second cluster, the target second cluster corresponds to a target hash value interval in a hash ring, and a hash value corresponding to the first cluster belongs to the target hash value interval; the second node receives task data; and the second node sends a first resource borrowing request to a first node, where the first resource borrowing request is used to indicate the first node to allocate the task data to the first cluster for processing.

In this way, distribution of the hash value corresponding to the first cluster and a hash node corresponding to the second cluster on the hash ring that is according to a consistent hash algorithm are determined, and each idle cluster is allowed to be borrowed only by a fixed empty cluster. Therefore, when the target second cluster needs to borrow an idle resource of the first cluster, the target second cluster does not need to randomly send a resource query request to a selected idle cluster to borrow the resource after receiving a response, and can directly borrow a resource from the first cluster. This reduces delay overheads of one round-trip information.

In an optional design of the second aspect, the method further includes: The second node determines, based on sending the first resource borrowing request to the first node, that the first cluster is in a resource non-borrowing state. In this way, after the second node sends the first resource borrowing request to the first node, it is equivalent to that an idle resource of the first cluster is occupied, and it may be determined that the first cluster is in the resource non-borrowing state. Optionally, the second node may mark, in a mapping table, that a resource borrowing state of the first cluster is the resource non-borrowing state. Correspondingly, the first node may also determine that the first cluster is in the resource non-borrowing state. In other words, the first node may determine that the first cluster cannot provide an available resource for another busy cluster. This ensures resource locking and implements cross-cluster resource scheduling without a conflict.

In an optional design of the second aspect, there are a plurality of clusters that have the association relationship with the target second cluster, and that a second node determines a first cluster that has an association relationship with a target second cluster includes: The second node determines one of the plurality of clusters that have the association relationship with the target second cluster as the first cluster.

In an optional design of the second aspect, that the second node determines one of the plurality of clusters that have the association relationship with the target second cluster as the first cluster includes: The second node determines that a cluster corresponding to an idle resource amount that is in idle resource amounts of the plurality of clusters having the association relationship with the target second cluster and that has a minimum difference with a required resource amount of the task data is the first cluster. In this way, the second node determines that the cluster corresponding to the idle resource amount that is in the idle resource amounts of the plurality of clusters having the association relationship with the target second cluster and that has the minimum difference with the required resource amount of the task data is the first cluster. This improves resource utilization during resource borrowing.

In an optional design of the second aspect, the method further includes: The second node receives the required resource amount, of the task data, sent by a third node; and the second node sends an identifier of the first cluster and the idle resource amount of the first cluster to the third node based on that the idle resource amount of the first cluster is greater than or equal to the required resource amount.

In an optional design of the second aspect, that the second node receives task data includes: The second node receives a second resource borrowing request sent by the third node, where the second resource borrowing request includes the task data, and the second borrowing request is used to indicate the second node to allocate the task data to the first cluster for processing.

According to a third aspect, this application provides a resource borrowing method, including: a second node receives a required resource amount, of task data, sent by a third node; the second node determines a first cluster that has an association relationship with a target second cluster, where the second node belongs to the target second cluster, the target second cluster corresponds to a target hash value interval in a hash ring, and a hash value corresponding to the first cluster belongs to the target hash value interval; and the second node sends a third resource borrowing request to the third node based on that an idle resource amount of the first cluster is greater than or equal to the required resource amount, where the third resource borrowing request is used to indicate that the third node is allowed to apply for a resource from the first cluster.

In this way, the first node may determine, based on distribution of the hash value corresponding to the first cluster on the hash ring (generated based on a hash value corresponding to the second cluster), the target second cluster corresponding to the first cluster, and establish the association relationship between the target second cluster and the first cluster. Distribution of the hash value corresponding to the first cluster and a hash node corresponding to the second cluster on the hash ring that is according to a consistent hash algorithm is determined, and each idle cluster is allowed to be borrowed only by a fixed empty cluster. Therefore, when the third node needs to borrow a resource from the second node, the second node does not need to randomly send a resource query request to a selected idle cluster to borrow the resource after receiving a response, and can directly determine the first cluster that can borrow the resource. This reduces delay overheads of one round-trip information.

In an optional design of the third aspect, there are a plurality of clusters that have the association relationship with the target second cluster, and that the second node determines a first cluster that has an association relationship with a target second cluster includes: The second node determines one of the plurality of clusters that have the association relationship with the target second cluster as the first cluster.

According to a fourth aspect, this application provides a resource borrowing method, including: A third node receives task data; the third node sends a required resource amount of the task data to a second node; the third node receives a third resource borrowing request sent by the second node, where the third resource borrowing request is used to indicate that the third node is allowed to apply for a resource from a first cluster, the second node belongs to a target second cluster, the target second cluster corresponds to a target hash value interval in a hash ring, a hash value corresponding to the first cluster belongs to the target hash value interval, and an idle resource amount of the first cluster is greater than or equal to the required resource amount; and the third node sends a first resource borrowing request to a first node, where the first borrowing request is used to indicate the first node to allocate the task data to the first cluster for processing.

In this way, distribution of the hash value corresponding to the first cluster and a hash node corresponding to the second cluster on the hash ring that is according to a consistent hash algorithm is determined and relatively balanced. Therefore, when the third node needs to borrow a resource from the second node, the second node does not need to randomly send a resource query request to a selected idle cluster to borrow the resource after receiving a response, and can directly determine the first cluster from which the resource can be borrowed. This reduces delay overheads of one round-trip information.

In an optional design of the fourth aspect, that the third node sends a required resource amount of the task data to a second node includes: The third node sends the required resource amount of the task data to a plurality of nodes, where the second node is one of the plurality of nodes; and that the third node receives a third resource borrowing request sent by the second node includes: The third node receives third resource borrowing requests sent by the plurality of nodes, where the third resource borrowing request is used to indicate that the third node is allowed to apply for a resource from a plurality of sub-clusters, and the first cluster is one of the plurality of sub-clusters.

In an optional design of the fourth aspect, the method further includes: the third node determines that a sub-cluster corresponding to an idle resource amount that is in idle resource amounts of the plurality of sub-clusters and that has a minimum difference with the required resource amount of the task data is the first cluster.

According to a fifth aspect, this application provides a first management node, where the first management node includes:

a processing module, configured to: determine a hash value corresponding to a first cluster; obtain a hash ring, where the hash ring includes at least one hash value interval, and each hash value interval corresponds to one second cluster; and determine a corresponding target second cluster based on the hash value corresponding to the first cluster, where the hash value corresponding to the first cluster belongs to a target hash interval, the target hash interval is a hash value interval in the at least one hash value interval, and the target hash interval corresponds to the target second cluster; and a transceiver module, configured to establish an association relationship between the first cluster and the target second cluster, where the target second cluster that has the association relationship with the first cluster is allowed to apply for a resource from the first cluster.

In an optional design of the fifth aspect, the hash ring includes a first hash node and a second hash node, the first hash node corresponds to the target second cluster, the first hash node is an adjacent successor node of the second hash node on the hash ring, and the target hash interval is a hash interval between a hash value of the first hash node and a hash value of the second hash node.

In an optional design of the fifth aspect, the processing module is further configured to divide an idle cluster including a plurality of computing nodes, to obtain a plurality of sub-clusters, where the first cluster is one of the plurality of sub-clusters.

In an optional design of the fifth aspect, the plurality of sub-clusters include a third sub-cluster and a fourth sub-cluster, the third sub-cluster is a sub-cluster having a maximum idle resource amount in the plurality of sub-clusters, the fourth sub-cluster is a cluster having a minimum idle resource amount in the plurality of sub-clusters, and an absolute value of a difference between the idle resource amount of the third sub-cluster and the idle resource amount of the fourth sub-cluster is less than a first threshold.

In an optional design of the fifth aspect, an absolute value of a difference between an idle resource amount of each of the plurality of sub-clusters and a preset idle resource amount is less than or equal to a second threshold, and the preset idle resource amount is related to a historical requested resource amount.

In an optional design of the fifth aspect, a quantity of the plurality of sub-clusters and a quantity of second clusters are less than a third threshold.

In an optional design of the fifth aspect, the transceiver module is further configured to:
receive a first resource borrowing request sent by the target second cluster, where the first resource borrowing request includes task data and an identifier of the first cluster; and
send the task data to the first cluster based on the identifier of the first cluster.

In an optional design of the fifth aspect, the transceiver module is further configured to:
receive a first resource borrowing request sent by the target second cluster, where the first resource borrowing request includes task data, and send the task data to the first cluster.

In an optional design of the fifth aspect, the transceiver module is specifically configured to send the task data to the first cluster based on the association relationship between the first cluster and the target second cluster.

In an optional design of the fifth aspect, the hash ring includes Y hash nodes, and each second cluster corresponds to at least one hash node, hash values corresponding to the Y hash nodes and the hash value corresponding to the first cluster are generated according to a same hash algorithm, and Y is a positive integer.

In an optional design of the fifth aspect, the processing module is further configured to: determine Y hash values corresponding to X second clusters, where each second cluster corresponds to at least one hash value, X is a positive integer, and Y is a positive integer greater than or equal to X; and generate the hash ring based on the Y hash values, where the hash ring includes the Y hash nodes, each second cluster corresponds to the at least one hash node, the Y hash nodes divide the hash ring into Y hash value intervals, and each hash node corresponds to one hash value interval.

In an optional design of the fifth aspect, the transceiver module is further configured to receive the hash ring sent by the second cluster.

In an optional design of the fifth aspect, the transceiver module is further configured to send an idle resource amount of the first cluster to the target second cluster.

According to a sixth aspect, this application provides a second management node, where the second management node includes:

a processing module, configured to determine a first cluster that has an association relationship with a target second cluster, where the second node belongs to the target second cluster, the target second cluster corresponds to a target hash value interval in a hash ring, and a hash value corresponding to the first cluster belongs to the target hash value interval; and a transceiver module, configured to receive task data, and send a first resource borrowing request to a first node, where the first resource borrowing request is used to indicate the first node to allocate the task data to the first cluster for processing.

In an optional design of the sixth aspect, the processing module is further configured to determine, based on that the transceiver module sends the first resource borrowing request to the first node, that the first cluster is in a resource non-borrowing state.

In an optional design of the sixth aspect, there are a plurality of clusters that have the association relationship with the target second cluster, and the processing module is specifically configured to determine one of the plurality of clusters that have the association relationship with the target second cluster as the first cluster.

In an optional design of the sixth aspect, the processing module is specifically configured to determine that a cluster corresponding to an idle resource amount that is in idle resource amounts of the plurality of clusters having the association relationship with the target second cluster and that has a minimum difference with a required resource amount of the task data is the first cluster.

In an optional design of the sixth aspect, the transceiver module is further configured to receive the required resource amount, of the task data, sent by a third node, and send an identifier of the first cluster and the idle resource amount of the first cluster to the third node based on that the idle resource amount of the first cluster is greater than or equal to the required resource amount.

In an optional design of the sixth aspect, the transceiver module is specifically configured to receive a second resource borrowing request sent by the third node, where the second resource borrowing request includes the task data, and the second borrowing request is used to indicate the second node to allocate the task data to the first cluster for processing.

According to a seventh aspect, this application provides a second management node, where the second management node includes:

a transceiver module, configured to receive a required resource amount, of task data, sent by a third node; and a processing module, configured to determine a first cluster that has an association relationship with a target second cluster, where the second node belongs to the target second cluster, the target second cluster corresponds to a target hash value interval in a hash ring, and a hash value corresponding to the first cluster belongs to the target hash value interval, where the transceiver module is further configured to send a third resource borrowing request to the third node based on that an idle resource amount of the first cluster is greater than or equal to the required resource amount, where the third resource borrowing request is used to indicate that the third node is allowed to apply for a resource from the first cluster.

In an optional design of the seventh aspect, there are a plurality of clusters that have the association relationship with the target second cluster, and the processing module is specifically configured to determine one of the plurality of clusters that have the association relationship with the target second cluster as the first cluster.

According to an eighth aspect, this application provides a third management node, where the third management node includes:

a transceiver module, configured to: receive task data; send a required resource amount of the task data to a second node; receive a third resource borrowing request sent by the second node, where the third resource borrowing request is used to indicate that the third node is allowed to apply for a resource from a first cluster, the second node belongs to a target second cluster, the target second cluster corresponds to a target hash value interval in a hash ring, a hash value corresponding to the first cluster belongs to the target hash value interval, and an idle resource amount of the first cluster is greater than or equal to the required resource amount; and send a first resource borrowing request to a first node, where the first borrowing request is used to indicate the first node to allocate the task data to the first cluster for processing.

In an optional design of the eighth aspect, the transceiver module is specifically configured to: send the required resource amount of the task data to a plurality of nodes, where the second node is one of the plurality of nodes; and receive third resource borrowing requests sent by the plurality of nodes, where the third resource borrowing request is used to indicate that the third node is allowed to apply for a resource from a plurality of sub-clusters, and the first cluster is one of the plurality of sub-clusters.

In an optional design of the eighth aspect, the third management node further includes:

a processing module, configured to determine that a sub-cluster corresponding to an idle resource amount that is in idle resource amounts of the plurality of sub-clusters and that has a minimum difference with the required resource amount of the task data is the first cluster.

According to a ninth aspect, this application provides a cluster, where the cluster includes a plurality of computing nodes, the computing nodes provide a required resource for task data to execute the task data, and the cluster further includes the first management node according to any one of the foregoing aspects.

According to a tenth aspect, this application provides a cluster, where the cluster includes a plurality of computing nodes, the computing nodes provide a required resource for task data to execute the task data, and the cluster further includes the second management node according to any one of the foregoing aspects.

According to an eleventh aspect, this application provides a cluster, where the cluster includes a plurality of computing nodes, the computing nodes provide a required resource for task data to execute the task data, and the cluster further includes the third management node according to any one of the foregoing aspects.

According to a twelfth aspect, this application provides a distributed system, where the distributed system includes the cluster described in the ninth aspect and the cluster described in the tenth aspect.

According to a thirteenth aspect, this application provides a distributed system, where the distributed system includes the cluster described in the ninth aspect, the cluster described in the tenth aspect, and the cluster described in the eleventh aspect.

According to a fourteenth aspect, this application provides a computer storage medium, configured to store a computer software instruction used by the first management node. The computer storage medium includes a program designed for performing the foregoing aspect.

According to a fifteenth aspect, this application provides a computer storage medium, configured to store a computer software instruction used by the second management node. The computer storage medium includes a program designed for performing the foregoing aspect.

According to a sixteenth aspect, this application provides a computer storage medium, configured to store a computer software instruction used by the third management node. The computer storage medium includes a program designed for performing the foregoing aspect.

In this embodiment of this application, a first node determines a hash value corresponding to a first cluster; the first node obtains a hash ring, where the hash ring includes at least one hash value interval, and each hash value interval corresponds to one second cluster; the first node determines a corresponding target second cluster based on the hash value corresponding to the first cluster, where the hash value corresponding to the first cluster belongs to a target hash interval, the target hash interval is a hash value interval in the at least one hash value interval, and the target hash interval corresponds to the target second cluster; and the first node establishes an association relationship between the first cluster and the target second cluster, where the target second cluster that has the association relationship with the first cluster is allowed to apply for a resource from the first cluster. In the foregoing manner, the first node may determine, based on distribution of the hash value corresponding to the first cluster on the hash ring (generated based on a hash value corresponding to the second cluster), the target second cluster corresponding to the first cluster, and establish the association relationship between the target second cluster and the first cluster. Distribution of the hash value corresponding to the first cluster and a hash node corresponding to the second cluster on the hash ring that is according to a consistent hash algorithm is determined, and each idle cluster is allowed to be borrowed only by a fixed empty cluster. Therefore, when the target second cluster needs to borrow an idle resource of the first cluster, the target second cluster does not need to randomly send a resource query request to a selected idle cluster to borrow the resource after receiving a response, and can directly borrow the resource from the first cluster. This reduces delay overheads of one round-trip information.

DESCRIPTION OF EMBODIMENTS

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances so that the embodiments of this application described herein can be implemented in orders except the order illustrated or described herein. Moreover, the terms "include", "have" and any other variants mean to cover the non-exclusive inclusion, for example, a process, method, system, product, or device that includes a series of steps or units is not necessarily limited to those expressly listed steps or units, but may include other steps or units not expressly listed or inherent to such a process, method, system, product, or device.

To make objectives, technical solutions, and advantages of the present invention clearer, the following further describes implementations of the present invention in detail with reference to accompanying drawings.

Figure 1:
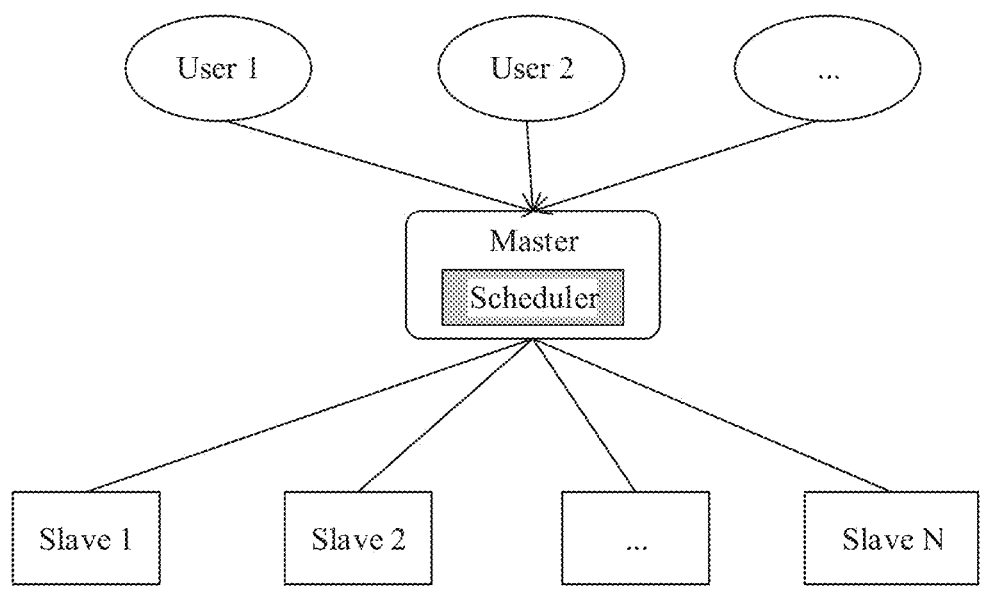
FIG. 1 is a schematic diagram of an architecture of a centralized distributed system with a one-layer architecture.

The following describes, by using FIG. 1 as an example, a system architecture of a distributed system to which an embodiment of the present invention is applied.

FIG. 1 is a schematic diagram of an architecture of a centralized distributed system with a one-layer architecture. In this architecture, users (a user 1, a user 2, . . . ) can submit task data to a master node (master) of a node cluster. The master node uses a scheduler (scheduler) to schedule and allocate resources required by the task data, to assign the task to slave nodes (a slave 1, a slave 2, . . . , a slave N) that have resources required by the task.

It should be noted that the master node (master) in this application may also be understood as a management node, and a slave node (slave) may be understood as a computing node.

In the foregoing plurality of architectures, the scheduler (scheduler) may be a hardware device integrated on a related node, or may be implemented by general purpose hardware of a node by using software. In the embodiments of the present invention, a specific manner of implementing a function of the scheduler by a management node is not limited.

Resource scheduling described in the embodiments of the present invention refers to allocating a resource of a computing node in a distributed manner to task data. It should be noted that in various embodiments of the present invention, the computing node refers to a resource set used as a resource scheduling unit in the distributed system. Usually, the computing node uses a server or a physical computer as a unit. However, in some scenarios, for different types of resources, the computing node may be obtained based on a different division unit. For example, when a CPU is used as a monitored resource, a processor or a processing core may be used as a division unit. In this case, each processor or processing core in the distributed system is used as one computing node, and one server may include a plurality of computing nodes. For another example, when only a storage resource is used as a monitored resource, a data fragment may be used as a division unit for a computing node. In this case, one data fragment in a distributed database is used as one computing node, and one server may include a plurality of data fragments, that is, include a plurality of computing nodes.

With development of artificial intelligence (AI) and an internet of things (IoT), many emerging compute-intensive and delay-sensitive terminal applications, such as virtual reality ( VR), augmented reality ( AR), and high-definition video and image processing, are rapidly emerging, and application requirements for low delay, high bandwidth, and strong computing are increasing. A cloud computing technology is affected by factors such as a network link capacity limitation, may likely cause problems such as an excessively slow data transmission rate and an excessively high response delay, and therefore cannot meet an application service requirement. Using an edge device close to a data source to perform computing to improve service response performance gradually becomes a trend. However, a single edge device has a small computing capability, and it is difficult to meet a requirement of a large-scale task by using only the single edge device to execute a task. Therefore, computing capabilities of a plurality of edge devices are combined for use, and the plurality of edge devices perform resource sharing and mutual assistance cooperate to cooperatively complete data processing of a complex task, and this effectively ensures quality of service.

There are mainly two types of resource mutual assistance scenarios between devices. One type is hierarchical resource assistance between heterogeneous devices, for example, cooperation of devices with different computing capabilities between an edge device and an edge server and between the edge device and a cloud processor. The other type is resource cooperation between devices at a same layer. To be specific, when resources of an edge device are insufficient, the edge device may borrow resources from another edge device.

Figure 2:
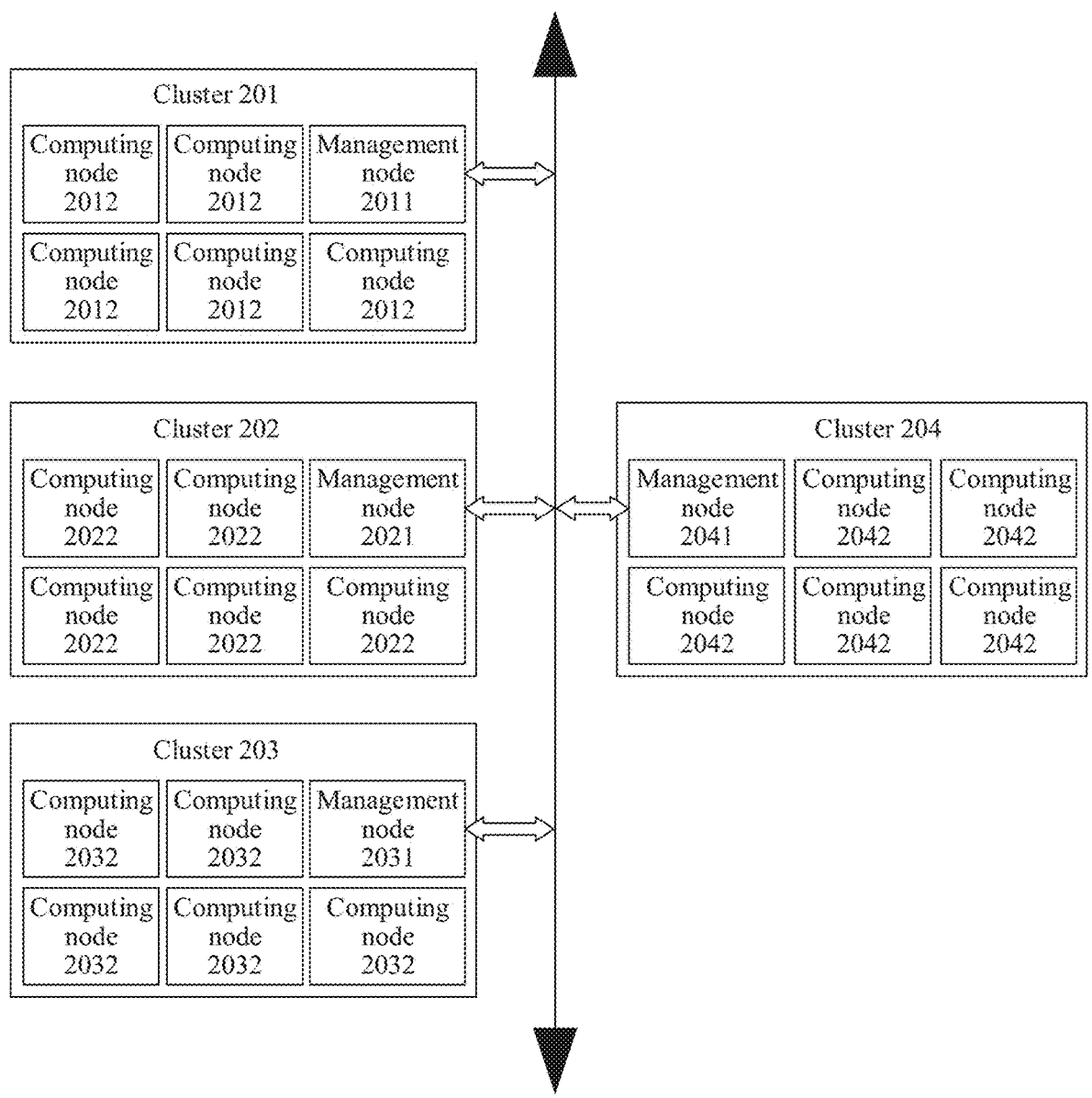
FIG. 2 is a schematic diagram of an architecture of a resource borrowing scenario.

FIG. 2 is a schematic diagram of an architecture of a resource borrowing scenario. As shown in FIG. 2, the architecture includes a cluster 201, a cluster 202, a cluster 203, and a cluster 204. The cluster 201, the cluster 202, and the cluster 203 are idle clusters with a relatively large idle resource amount, and the cluster 204 is a busy cluster with a relatively small idle resource amount. The cluster 201 includes a management node 2011 and a plurality of computing nodes 2012. The cluster 202 includes a management node 2021 and a plurality of computing nodes 2022. The cluster 203 includes a management node 2031 and a plurality of computing nodes 2032. The cluster 204 includes a management node 2041 and a plurality of computing nodes 2042.

In an embodiment, for example, the cluster 204 has an insufficient idle resource amount, and cross-cluster resource borrowing may be performed according to the following policy.

The management node 2041 sorts the cluster 201, the cluster 202, and the cluster 203 in descending order of sizes of the idle resource amounts, to obtain a first cluster list.

For example, the first cluster list is {the cluster 201, the cluster 203, and the cluster 202}.

The management node 2041 receives task data, and determines that an available idle resource amount of the plurality of computing nodes 2042 is less than a required resource amount of the task data.

The management node 2041 selects, from the first cluster list, a cluster whose idle resource amount meets a resource requirement of the task data, to obtain a second cluster list.

For example, if the idle resource amounts of the cluster 201, the cluster 202, and the cluster 203 all meet the resource requirement of the task data, the second cluster list is {the cluster 201, the cluster 203, and the cluster 202}.

The management node 2041 randomly selects two clusters from the second cluster list, and sends a resource query request to the selected two clusters.

For example, the management node 2041 selects the cluster 201 and the cluster 203. In this case, the management node 2041 may send the resource query request to the management node 2011 and the management node 2021.

The management node 2041 selects the first cluster that returns a borrowing result and that meets the resource requirement of the task data, and performs cross-cluster resource borrowing.

For example, if the cluster 201 is the first cluster that returns the borrowing result and that meets the resource requirement of the task data, the management node may send the task data to the management node 2011, so that the management node 2011 schedules a plurality of computing nodes to process the task data.

However, in the foregoing design, the management node 2041 needs to send the resource query request to randomly selected k clusters when performing cross-cluster resource borrowing, and performs resource borrowing after receiving a returned borrowing result. Therefore, before resource borrowing, delay overheads of one round-trip information are required, which increases a delay.

In addition, resources are borrowed by cluster. In a scenario that a quantity of clusters is small but a quantity of nodes in a cluster is large, when concurrent borrowing is performed, there is a high probability that a borrowing conflict occurs. In other words, resources may be borrowed by a plurality of busy clusters from a same idle cluster. For example, the foregoing embodiment is used as an example. If the cluster 201 and the cluster 203 are both being borrowed by another busy cluster, a resource borrowing conflict occurs between the cluster 201 and the cluster 203. Consequently, no cluster returns a borrowing result.

Figure 3A:
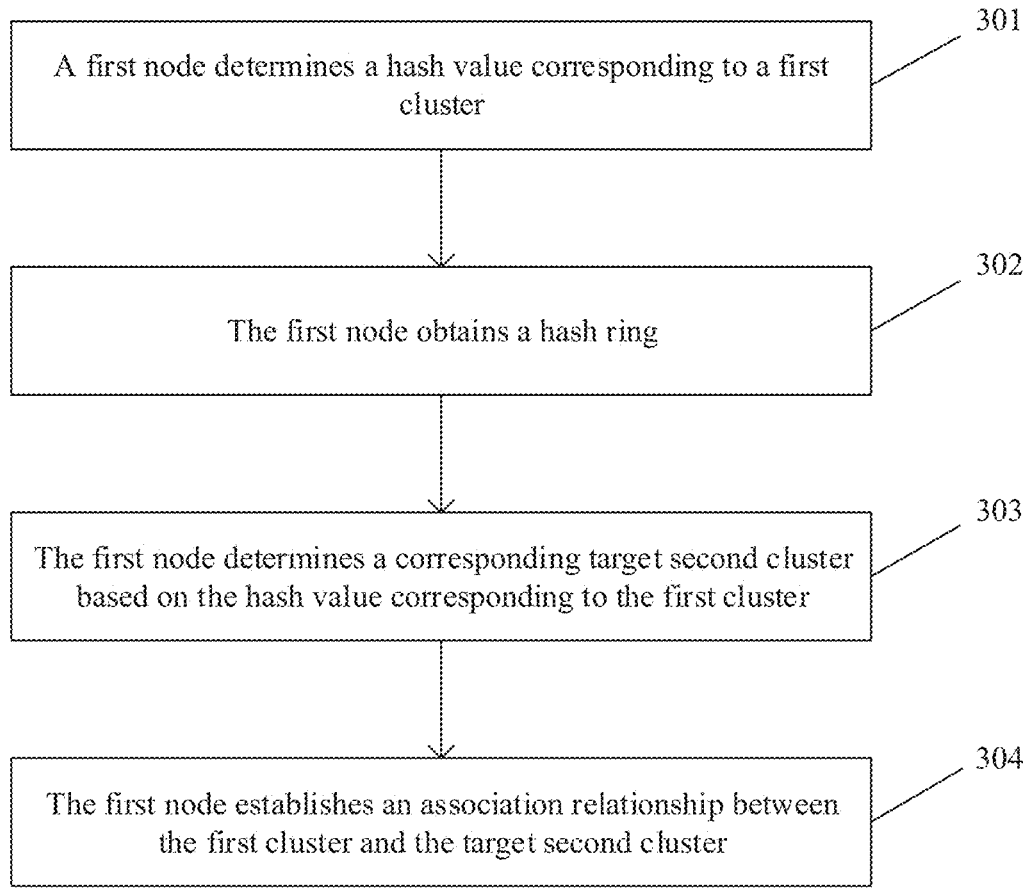
FIG. 3a is a schematic diagram of an embodiment of a resource allocation method according to an embodiment of this application.

To resolve the foregoing technical problem, this application provides a resource allocation method. FIG. 3a is a schematic diagram of an embodiment of a resource allocation method according to an embodiment of this application. As shown in FIG. 3a, the resource allocation method provided in this application includes the following steps.

301: A first node determines a hash value corresponding to a first cluster.

In this embodiment of this application, the first node may be a management node of an idle cluster. The idle cluster includes the first node and a plurality of computing nodes. The first cluster may be a node cluster including all or some of the plurality of computing nodes, or the first cluster may include the first node. This is not limited herein.

In this embodiment of this application, before determining the hash value corresponding to the first cluster, the first node may first determine a busy/idle state of a cluster in which the first node is located.

Optionally, in an embodiment, the first node may evaluate a busy/idle state of a node based on an occupation rate of a primary resource of the computing node in the cluster in which the first node is located, and evaluate the busy/idle state of the cluster based on the quantity of busy nodes and the quantity of idle nodes in the cluster in which the first node is located.

For example, the first node may define the busy/idle state of the computing node according to the following formulas:

$$P_i = \frac{\text{Use}(i)}{\text{Total}(i)},$$

i represents an $i^{th}$ type of resource, Use(i) represents a resource occupation amount of the $i^{th}$ type of resource that is being used, and Total(i) represents a total resource amount of the $i^{th}$ type of resource; and $$\text{state (node)} = \max\{P_i\} = \begin{cases} \geq a, \text{the node is busy} \\ > a, \text{the node is idle} \end{cases}, \text{where}$$

a is a preset threshold, and $\max\{P_i\}$ represents a maximum of i resource occupation rates.

In this embodiment of this application, when a maximum resource occupation rate of the computing node is greater than or equal to the threshold a, the first node may determine that the computing node is a busy node; or when the maximum resource occupation rate of the computing node is less than the threshold a, the first node may determine that the computing node is an idle node.

It should be noted that the threshold a may be adjusted in real time based on a requirement, and may be configured based on different scenarios. This is not limited in this application.

For example, the first node may define a busy/idle state of the cluster in which the first node is located in the following manner.

In the cluster in which the first node is located, the quantity of busy nodes is n, and the quantity of idle nodes is m.

When m=1, in other words, when there is only one idle node in the cluster in which the first node is located, the first node may determine that the cluster in which the first node is located is a busy cluster.

When $$m \neq 1, p = \frac{m}{n} \text{ and state (cluster)} = P = \begin{cases} \geq b, \text{the cluster is idle} \\ > b, \text{the cluster is busy} \end{cases}$$

are calculated, where b is a preset threshold.

It should be noted that the threshold b may be adjusted in real time based on a requirement, and may be configured based on different scenarios. This is not limited in this application.

Figure 3B:
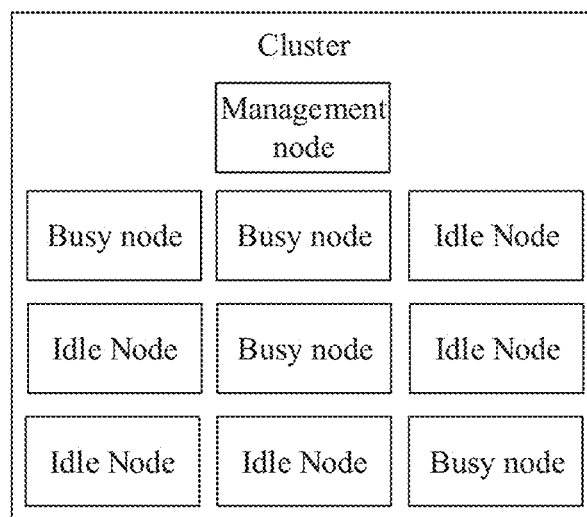
FIG. 3b is a schematic diagram of distribution of cluster idle/busy states.
Figure 3C:
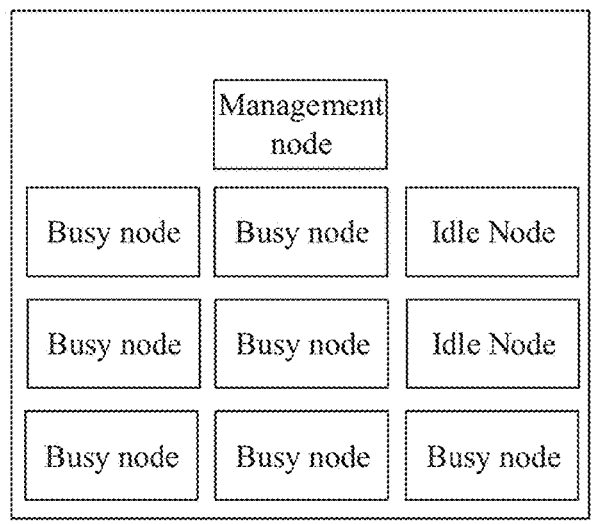
FIG. 3c is a schematic diagram of distribution of cluster idle/busy states.

FIG. 3b and FIG. 3c are schematic diagrams of distribution of cluster idle/busy states. As shown in FIG. 3b and FIG. 3c, in FIG. 3b, there are four busy nodes and five idle nodes in the cluster, that is, n=4 and m=5.

In this case, p=1.25. If it is determined that the threshold b is 0.3, because 1.25>0.3, the cluster shown in FIG. 3b is an idle cluster, and may provide an idle resource.

Similarly, in the cluster shown in FIG. 3c, there are seven busy nodes and two idle nodes, that is, n=7 and m=2.

In this case, p=0.286. Because 0.286<0.3, the cluster shown in FIG. 3c is a busy cluster.

In this embodiment of this application, when determining that the idle/busy state of the cluster in which the first node is located is idle, the first node may determine the hash value corresponding to the first cluster.

Optionally, the idle cluster in which the first node is located includes a plurality of computing nodes, and the first node may divide the plurality of computing nodes in the idle cluster to obtain a plurality of sub-clusters.

In an embodiment, the plurality of sub-clusters include a third sub-cluster and a fourth sub-cluster, the third sub-cluster is a sub-cluster having a maximum idle resource amount in the plurality of sub-clusters, the fourth sub-cluster is a cluster having a minimum idle resource amount in the plurality of sub-clusters, and an absolute value of a difference between the idle resource amount of the third sub-cluster and the idle resource amount of the fourth sub-cluster is less than a first threshold.

In other words, in this embodiment of this application, the first node may divide the plurality of computing nodes in the idle cluster, so that a difference between resource idle amounts of first clusters in the plurality of sub-clusters obtained after the division is not excessively large (the absolute value of the difference between the maximum resource idle amount and the minimum resource idle amount is less than the first threshold).

For example, the first node may randomly select some idle nodes or all idle nodes from a plurality of idle nodes of the idle cluster as a reserved resource, to provide a resource for local busy nodes of the idle cluster.

In this embodiment of this application, the first node may determine remaining idle nodes other than the idle nodes used as the reserved resource as borrowable resources, and group the borrowable resources.

Specifically, the first node may first calculate a resource idle rate $r_i = \alpha \times c_i + \beta \times m_i$ of each idle node in the borrowable resources, and sort the nodes in descending order based on the resource idle rate, where $c_i$ represents a CPU resource idle rate, $m_i$ represents a memory resource idle rate, and $\alpha$ and $\beta$ respectively represent weight parameters of the CPU resource idle rate and the memory resource idle rate.

The first node divides the borrowable resources into j groups, performs an "s"-shaped packing operation on all borrowable nodes, and calculates a total idle rate $R_j = \Sigma r_i$ and $\sigma_j = \max\{R_j\} - \min\{R_j\}$ of each idle resource group. When $\sigma_j$ is greater than $\sigma_{j-1}$ through iteration, the algorithm terminates, and j−1 groups are used as a grouping result, where n represents the quantity of the borrowable nodes. It should be noted that j is a configurable parameter, and may be selected based on a requirement in actual application. This is not limited herein.

Figure 3D:
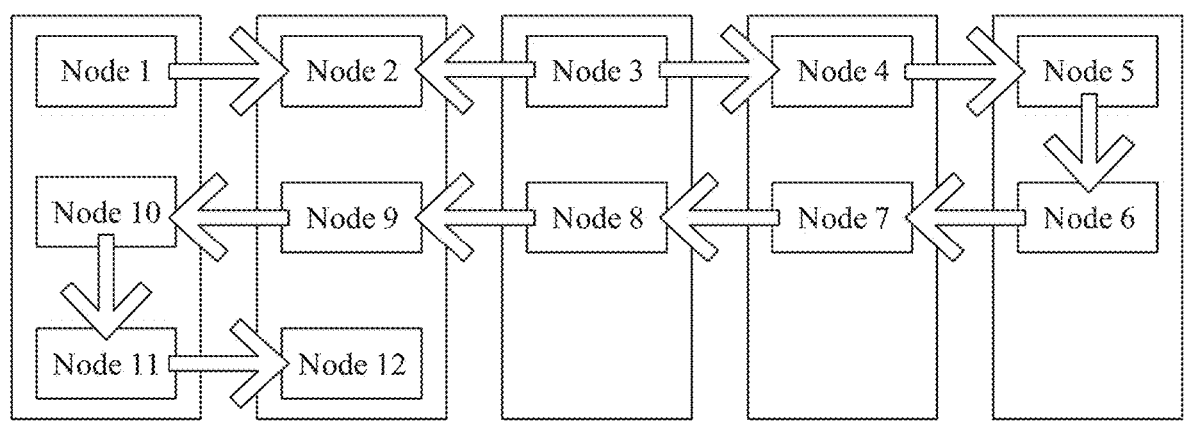
FIG. 3d is a schematic diagram of a packing result according to an embodiment of this application.

For example, the first node may determine that the remaining idle nodes in the idle nodes except the nodes used as the reserved resources include: {a node 1, a node 2, a node 3, a node 4, a node 5, a node 6, a node 7, a node 8, a node 9, a node 10, a node 11, and a node 12}. Each node has been sorted in descending order of idle rates (in other words, an idle rate of the node 1 is the highest, and an idle rate of the node 12 is the lowest). FIG. 3d is a schematic diagram of a packing result according to an embodiment of this application. When it is determined that a quantity j of groups is 5, a schematic diagram of an "S"-shaped packing result is shown in FIG. 3d. In FIG. 3d, five sub-clusters are obtained after the division.

In another embodiment, an absolute value of a difference between an idle resource amount of each of the plurality of sub-clusters and a preset idle resource amount is less than or equal to a second threshold, and the preset idle resource amount is related to a historical requested resource amount.

Specifically, the idle resource amount may include an idle CPU resource amount and an idle memory resource amount, and the preset idle resource amount may include a preset idle CPU resource amount and a preset idle memory resource amount. The preset idle resource amount is related to the historical requested resource amount, and correspondingly, the preset idle CPU resource amount is related to a historical requested CPU resource amount, and the preset idle memory resource amount is related to a historical requested memory resource amount.

In this embodiment of this application, an absolute value of a difference between an idle CPU resource amount of each of the plurality of sub-clusters and a preset idle CPU resource amount is less than or equal to a third threshold, and an absolute value of a difference between an idle memory resource amount of each of the plurality of sub-clusters and a preset idle memory resource amount is less than or equal to a fourth threshold.

In this embodiment of this application, the preset idle CPU resource amount and the preset idle memory resource amount may be determined based on a requested resource amount in a historical borrowing request. For example, the first node may record information about requested resources in the idle cluster in which the first node is located in recent k periods, where k is an adjustable parameter.

Optionally, the first node may first respectively perform statistical averaging on a requested CPU resource amount and a memory requested resource amount in the k periods based on a historical requested resource table, to obtain a historical average CPU requested amount $\overline{CPU}$ and a historical average memory requested amount $\overline{MEM}$ of each idle resource group in a single period:

$$\overline{CPU} = \frac{\sum_{i=1}^{k} \frac{CPU_i}{s_i}}{k} \text{ and } \overline{MEM} = \frac{\sum_{i=1}^{k} \frac{MEM_i}{s_i}}{k},$$

where $CPU_i$ represents a total requested CPU resource amount in an $i^{th}$ period, $s_i$ represents the quantity of idle resource groups in the i$^{th}$ period, and MEM$_i$ represents a total requested memory resource amount in the i$^{th}$ period.

The first node may determine that the historical average CPU requested amount $\overline{CPU}$ is the preset idle CPU resource amount, and the historical average memory requested amount $\overline{MEM}$ is the preset memory resource amount.

The first node may group the borrowable resources by using $\overline{CPU}$ and $\overline{MEM}$ as indicators, so that the idle CPU resource amount and the idle memory resource amount in each sub-cluster after grouping are close to $\overline{CPU}$ and $\overline{MEM}$.

The first node may calculate a contribution rate $$v_i = \alpha \times \frac{idle\_c_i}{\overline{CPU}} + \beta \times \frac{idle\_m_i}{\overline{MEM}}$$

of each idle node, sort the idle nodes in descending order based on the contribution rate, and divide the borrowable resources into N groups, where $$s = \max\left\{\left[\frac{sum\_cpu}{\overline{CPU}}\right], \left[\frac{sum\_mem}{\overline{MEM}}\right]\right\}.$$

"S"-shaped packing is performed on all borrowable nodes to obtain a plurality of sub-clusters.

idle_c$_i$ represents the idle CPU amount, idle_m$_i$ represents the idle memory amount, α and β represent the weight parameters of the CPU and the memory, sum_cpu represents a total borrowable idle CPU amount in the idle cluster, and sum_mem represents a total borrowable memory amount in the idle cluster.

For how the first node performs the "S"-shaped packing on all idle nodes to obtain the plurality of sub-clusters, refer to the description in the foregoing embodiment. Details are not described herein again.

In this embodiment of this application, a management node in a cluster may determine, at an interval of preset time, an idle/busy state of the cluster in which the management node is located. When determining that the cluster in which the management node is located is an idle cluster, the management node may divide all or some idle nodes in the idle cluster in the foregoing manner, to obtain a plurality of sub-clusters. When the management node determines that the cluster in which the management node is located is a busy cluster, the management node may broadcast a busy/idle state (a busy state) of the management node to another management node.

In this embodiment of this application, the first node may determine the hash value corresponding to the first cluster. Specifically, the first node may determine a hash value corresponding to each of the plurality of sub-clusters. It should be understood that the first node is one of the plurality of sub-clusters.

Specifically, the first cluster may uniquely correspond to an identifier. For example, an IP and an ID may be used to uniquely identify the first cluster. The IP is an identifier of an idle cluster in which the first node is located, and the ID is an identifier of a group. In this embodiment of this application, the IP may be an IP address of a server on which the idle cluster is located, and the IP address can contain the IP address and a port number of the server. For example, the hash value corresponding to the first cluster may be calculated based on the IP address of the server, port number information of the server, and the ID that is used to identify the group and that is of the server and according to a preset hash algorithm.

The first node may calculate, according to the preset hash algorithm, the hash value corresponding to each sub-cluster. Specifically, the first node may calculate a hash value of an identifier of each sub-cluster according to the preset hash algorithm. Because identifiers of the plurality of sub-clusters are different from each other, corresponding hash values are also different.

302: The first node obtains a hash ring, where the hash ring includes at least one hash value interval, and each hash value interval corresponds to one second cluster.

In this embodiment of this application, the hash ring may be understood as a data structure that includes hash values of a plurality of hash nodes and a hash value interval between two adjacent hash nodes. The data structure may be in a form of a list or an array. A specific form of the hash value is not limited in this application. Any data structure that can reflect a distribution feature of at least one second cluster shall fall within the protection scope of this application.

In an embodiment, the first node may construct the hash ring according to the preset hash algorithm.

In a distributed system according to a consistent hash (hash) algorithm, clusters may be distributed, based on hash values respectively corresponding to the clusters, on a value space logical ring which is referred to as the hash ring. The hash ring is usually generated and stored by the management node. A segment of data range (for example, a hash value range of 1000 to 20000 on the hash ring) on the hash ring is referred to as the hash value interval.

Specifically, when the management node determines that the cluster in which the management node is located is a busy cluster, the management node may broadcast a busy/idle state (a busy state) of the management node to another management node. Correspondingly, the first node may determine a busy cluster (the at least one second cluster) included in the distributed system.

The first node may calculate, according to a preset hash algorithm, a hash value corresponding to each second cluster. It should be noted that the preset hash algorithm may be a jhash hash algorithm, or may be another type of hash algorithm. This is not specifically limited in this embodiment of this application. The first node may select a proper hash algorithm based on a system requirement, provided that a same hash algorithm is used to calculate the hash value of the first cluster and calculate the hash value of the second cluster.

Figure 4A:
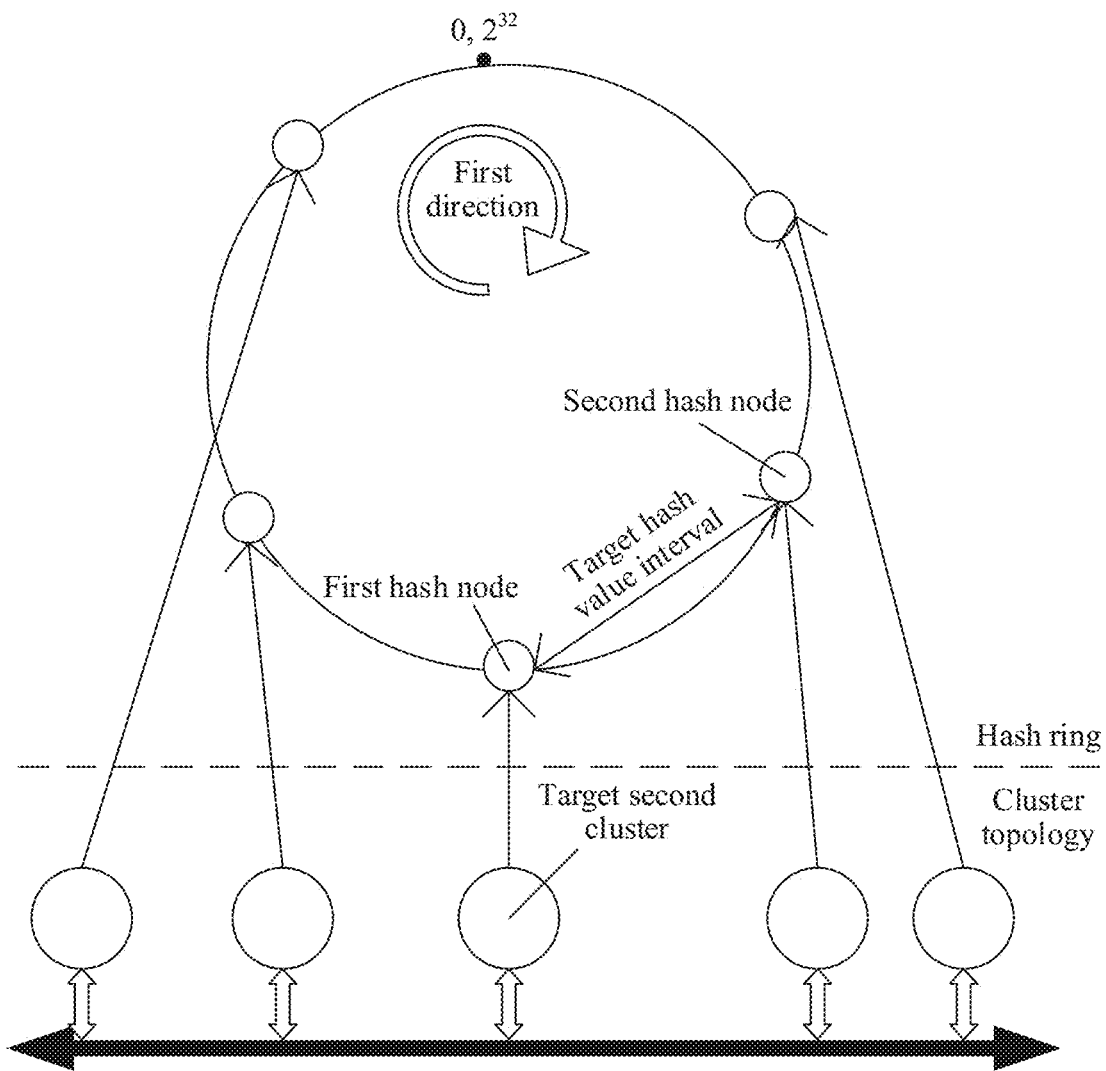
FIG. 4a is a schematic diagram of a structure of a hash ring according to an embodiment of this application.

The first node may generate the hash ring based on the hash value corresponding to each second cluster. FIG. 4a is a schematic diagram of a structure of a hash ring according to an embodiment of this application. A data range of the hash ring is from 0 to 232, each large circle in the hash ring is a hash value obtained through calculation based on the identifier of the second cluster, and represents one second cluster. Second clusters are distributed at different positions on the hash ring based on hash values corresponding to the second clusters. As shown in FIG. 4a, the hash values corresponding to the second cluster divide the entire hash ring into a same quantity of hash value intervals as the second cluster, and one hash value interval is a data range of a segment of hash values on the hash ring.

Optionally, in an embodiment, the hash ring includes a first hash node and a second hash node, the first hash node corresponds to a target second cluster, the first hash node is an adjacent successor node of the second hash node on the hash ring, and a target hash interval is a hash interval between the first hash node and the second hash node.

In this embodiment of this application, each hash value interval on the hash ring corresponds to one second cluster. In a possible implementation, for any hash value interval forming the hash ring, searching starts from the hash value interval in a first direction, and a first found second cluster is determined as the second cluster corresponding to the hash value interval. In other words, if the hash value of the second cluster is a boundary hash value of the hash value interval in the first direction, it may be considered that the second cluster corresponds to the hash value interval. The first direction is a positive direction of the hash ring, and may be a clockwise direction or a counterclockwise direction. This is not specifically limited in this embodiment of this application. For example, in FIG. 4a, the clockwise direction is selected as the first direction.

In this embodiment of this application, the first node may determine Y hash values corresponding to X second clusters. Each second cluster corresponds to at least one hash value, X is a positive integer, and Y is a positive integer greater than or equal to X.

In an embodiment, Y is greater than X. In other words, there is a second cluster, and the second cluster corresponds to a plurality of hash values.

Figure 4B:
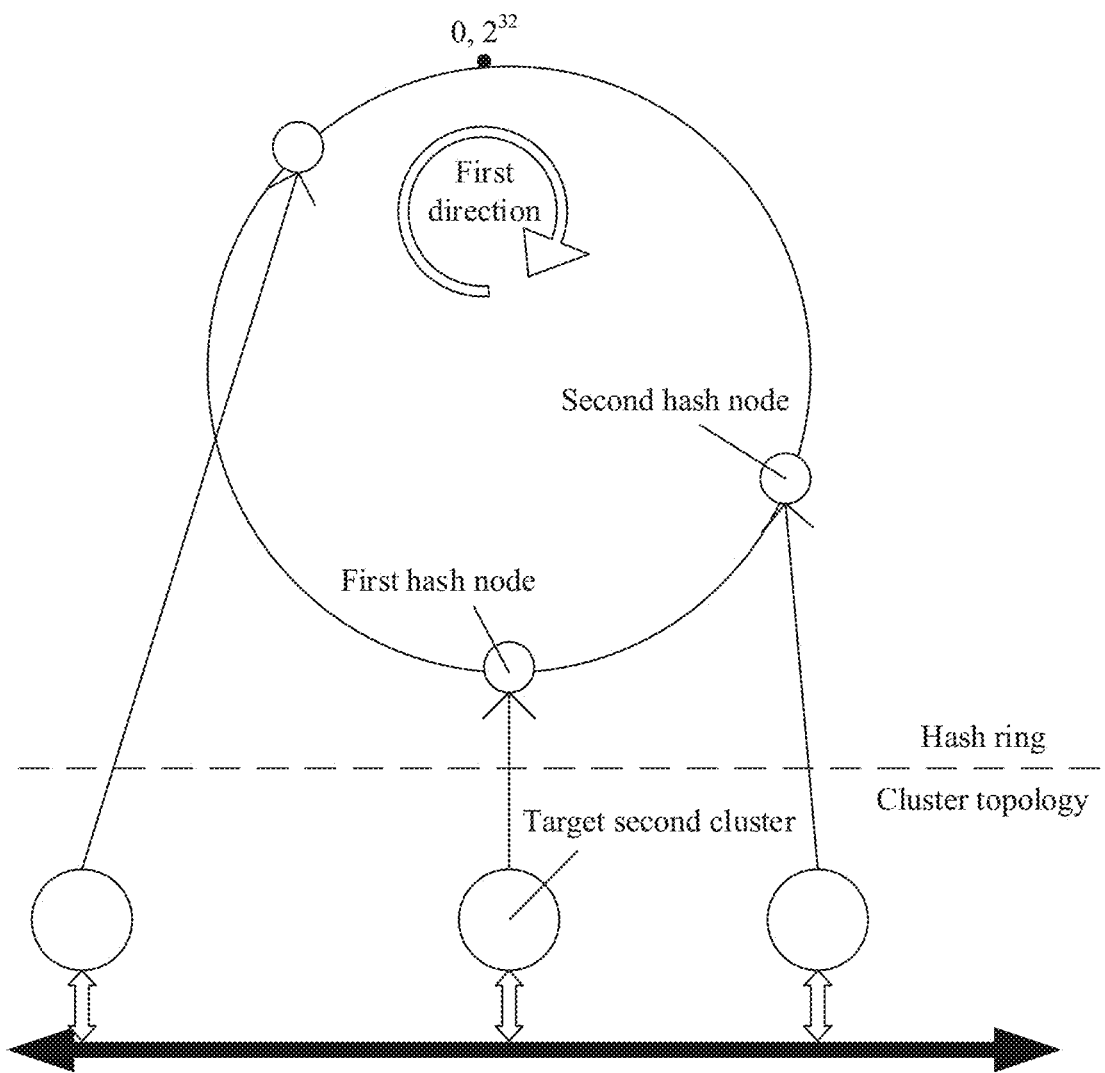
FIG. 4b is a schematic diagram of a structure of a hash ring according to an embodiment of this application.
Figure 4C:
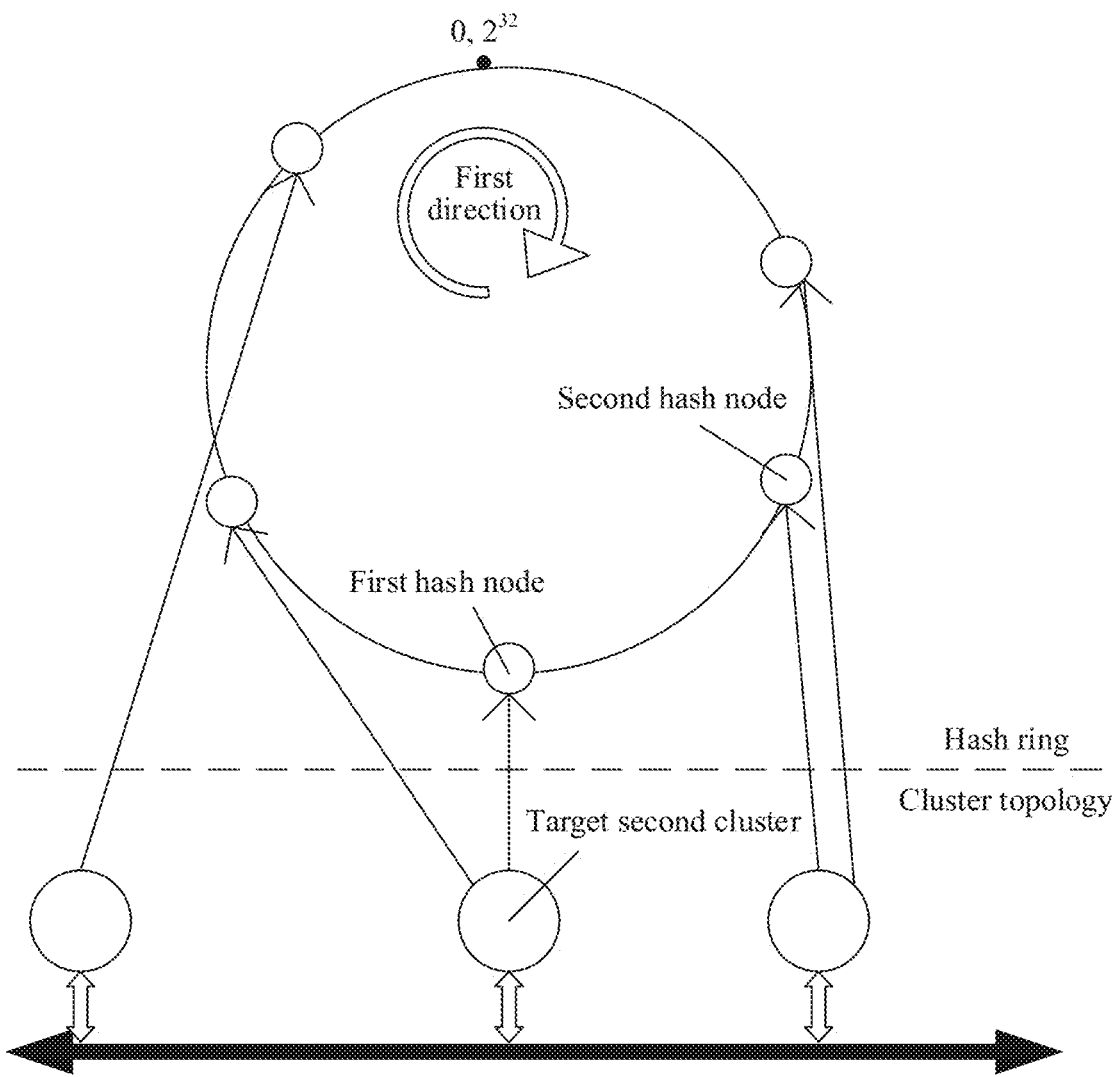
FIG. 4c is a schematic diagram of a structure of a hash ring according to an embodiment of this application.

In this embodiment of this application, when a quantity of the second clusters is excessively small, the distribution of the second clusters on the hash ring is excessively sparse. FIG. 4b is a schematic diagram of a structure of a hash ring according to an embodiment of this application. When the quantity of the second clusters is excessively small, the distribution of the second clusters on the hash ring is excessively sparse. Therefore, the second clusters may correspond to a plurality of nodes on the hash ring. In other words, a virtual node is introduced. FIG. 4c is a schematic diagram of a structure of a hash ring according to an embodiment of this application. As shown in FIG. 4c, the target second cluster may correspond to two hash nodes on the hash ring. By introducing the virtual node, the second clusters may correspond to the plurality of nodes on the hash ring, so that the distribution of the second clusters on the hash ring is not excessively sparse. For how to implement, by introducing the virtual node, the plurality of nodes on the hash ring corresponding to the second cluster, refer to implementation in an existing solution. Details are not described herein.

In this embodiment of this application, the first node generates the hash ring based on the Y hash values. The hash ring includes Y hash nodes, each second cluster corresponds to at least one hash node, the Y hash nodes divide the hash ring into Y hash value intervals, and each hash node corresponds to one hash value interval. In other words, each hash node corresponds to one second cluster, and one second cluster may correspond to the plurality of hash nodes on the hash ring.

In this embodiment of this application, the first node may periodically receive an idle/busy state broadcast by another cluster, and periodically update the hash ring based on the idle/busy state broadcast by the another cluster.

Optionally, in another embodiment, the first node may receive a hash table sent by the second cluster.

In this embodiment of this application, a management node (for example, a second node) in the second cluster may receive an idle/busy state broadcast by another cluster, and construct a hash ring based on the idle/busy state broadcast by the another cluster. For how the second cluster constructs the hash ring based on the idle/busy state broadcast by the another cluster, refer to the description in the foregoing embodiment. Details are not described herein again.

303: The first node determines a corresponding target second cluster based on the hash value corresponding to the first cluster, where the hash value corresponding to the first cluster belongs to a target hash interval, the target hash interval is a hash value interval in the at least one hash value interval, and the target hash interval corresponds to the target second cluster.

In this embodiment of this application, after determining the hash value corresponding to the first cluster and obtaining the hash ring generated based on the hash value of the second cluster, the first node may determine the corresponding target second cluster from the hash ring based on the hash value corresponding to the first cluster.

In this embodiment of this application, because each hash value interval on the hash ring corresponds to one second cluster, the first node may determine a hash value interval to which the hash value corresponding to the first cluster belongs on the hash ring as the target hash interval, and determine a second cluster corresponding to the target hash interval as the target second cluster.

Figure 4D:
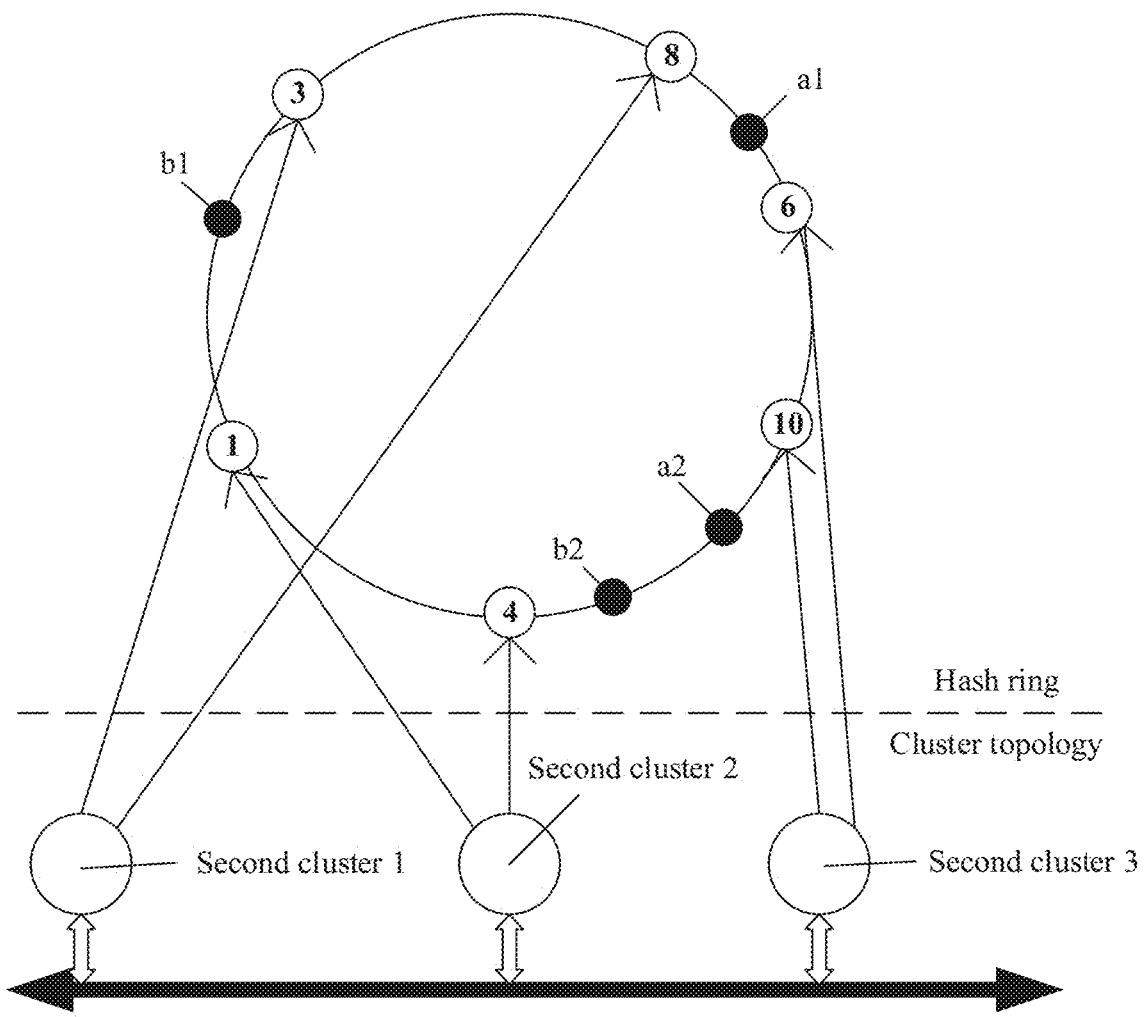
FIG. 4d is a schematic diagram of a structure of a hash ring according to an embodiment of this application.

FIG. 4d is a schematic diagram of a structure of a hash ring according to an embodiment of this application. As shown in FIG. 4d, the hash ring includes six hash nodes {a hash node 1, a hash node 3, a hash node 4, a hash node 6, a hash node 8, and a hash node 10}. The hash node 3 and the hash node 8 correspond to a second cluster 1, the hash node 1 and the hash node 4 correspond to a second cluster 2, and the hash node 6 and the hash node 10 correspond to the second cluster 3.

A hash value interval between the hash node 1 and the hash node 3 corresponds to the second cluster 1, a hash value interval between the hash node 3 and the hash node 4 corresponds to the second cluster 2, a hash value interval between the hash node 4 and the hash node 6 corresponds to the second cluster 3, a hash value interval between the hash node 6 and the hash node 8 corresponds to the second cluster 1, a hash value interval between the hash node 8 and the hash node 10 corresponds to the second cluster 3, and a hash value interval between the hash node 10 and the hash node 1 corresponds to the second cluster 2.

An idle cluster a includes two sub-clusters {a first cluster a1 and a first cluster a2}, and an idle cluster b includes two sub-clusters {a first cluster b1 and a first cluster b2}.

Distribution of first clusters {the first cluster a1, the first cluster a2, the first cluster b1, and the first cluster b2} on the hash ring is shown in FIG. 4d. A hash value corresponding to the first cluster a1 belongs to the hash value interval between the hash node 8 and the hash node 6, a hash value corresponding to the first cluster a2 belongs to a hash value interval between the hash node 4 and the hash node 10, a hash value corresponding to the first cluster b1 belongs to the hash value interval between the hash node 1 and the hash node 3, and a hash value corresponding to the first cluster b2 belongs to the hash value interval between the hash node 4 and the hash node 10.

With reference to the foregoing distribution of the first clusters in the hash ring, a first node in the idle cluster a may determine that the first cluster a1 corresponds to a second cluster in which the hash node 6 is located, the first node in the idle cluster a may determine that the first cluster a2 corresponds to a second cluster 4, a first node in the idle cluster b may determine that the first cluster b1 corresponds to the second cluster 3, and the first node in the idle cluster b may determine that the first cluster b2 corresponds to the second cluster 4.

304: The first node establishes an association relationship between the first cluster and the target second cluster, where the target second cluster that has the association relationship with the first cluster is allowed to apply for a resource from the first cluster.

In this embodiment of this application, after determining the corresponding target second cluster based on the hash value corresponding to the first cluster, the first node may send an identifier of the first cluster to the target second cluster. Specifically, after determining the corresponding target second cluster based on the hash value corresponding to the first cluster, the first node may send a resource allocation indication to the management node (the second node) in the target second cluster. The resource allocation indication includes the identifier of the first cluster, and the resource allocation indication may indicate that the target second node is allowed to apply for a resource from the first cluster.

Optionally, in an embodiment, the first node may further send an idle resource amount of the first cluster to the target second cluster.

Specifically, the first node may further send an idle CPU resource amount and an idle memory resource amount of the first cluster to the target second cluster.

On one hand, the first node may determine, based on distribution of the hash value corresponding to the first cluster on the hash ring (generated based on the hash value corresponding to the second cluster), the target second cluster corresponding to the first cluster, and establish the association relationship between the target second cluster and the first cluster. Distribution of the hash value corresponding to the first cluster and a hash node corresponding to the second cluster on the hash ring that is according to a consistent hash algorithm is determined, and each idle cluster is allowed to be borrowed only by a fixed empty cluster. Therefore, when the target second cluster needs to borrow an idle resource of the first cluster, the target second cluster does not need to randomly send a resource query request to a selected idle cluster to borrow the resource after receiving a response, and can directly borrow the resource from the first cluster. This reduces delay overheads of one round-trip information.

On the other hand, because a correspondence for resource borrowing is determined based on a correspondence that is on the hash ring generated based on a busy cluster and that is of the hash value of the first cluster, and the correspondence is unique, a resource of the idle cluster can be borrowed by only a corresponding busy cluster on the hash ring. Therefore, there is no borrowing conflict caused by concurrent borrowing of resources from a plurality of busy clusters to a same idle cluster.

In addition, the first node divides the plurality of computing nodes in the idle cluster to obtain the plurality of sub-clusters, and then may borrow a resource for another busy cluster in a unit of a sub-cluster, so that relatively balanced borrowing of idle resources in the idle cluster can be implemented.

In addition, when the quantity of the second clusters is excessively small, the distribution of the second clusters on the hash ring is excessively sparse. Therefore, the second cluster (for example, the target second cluster) may correspond to the plurality of nodes on the hash ring. In other words, a virtual node is introduced. In this way, a case in which one second cluster corresponds to a plurality of first clusters because the second clusters are excessively sparsely distributed on the hash ring does not occur. This improves resource allocation balance.

In this embodiment of this application, a first node determines a hash value corresponding to a first cluster; the first node obtains a hash ring, where the hash ring includes at least one hash value interval, and each hash value interval corresponds to one second cluster; the first node determines a corresponding target second cluster based on the hash value corresponding to the first cluster, where the hash value corresponding to the first cluster belongs to a target hash interval, the target hash interval is a hash value interval in the at least one hash value interval, and the target hash interval corresponds to the target second cluster; and the first node establishes an association relationship between the first cluster and the target second cluster, where the target second cluster that has the association relationship with the first cluster is allowed to apply for a resource from the first cluster. In the foregoing manner, on one hand, the first node may determine, based on distribution of the hash value corresponding to the first cluster on the hash ring (generated based on the hash value corresponding to the second cluster), the target second cluster corresponding to the first cluster, and establish the association relationship between the target second cluster and the first cluster. Distribution of the hash value corresponding to the first cluster and a hash node corresponding to the second cluster on the hash ring that is according to a consistent hash algorithm is determined, and each idle cluster is allowed to be borrowed only by a fixed empty cluster. Therefore, when the target second cluster needs to borrow an idle resource of the first cluster, the target second cluster does not need to randomly send a resource query request to a selected idle cluster to borrow the resource after receiving a response, and can directly borrow the resource from the first cluster. This reduces delay overheads of one round-trip information. In addition, because a correspondence for resource borrowing is determined based on a correspondence that is on the hash ring generated based on a busy cluster and that is of the hash value of the first cluster, and the correspondence is unique, a resource of the idle cluster can be borrowed by only a corresponding busy cluster on the hash ring. Therefore, there is no borrowing conflict caused by concurrent borrowing of resources from a plurality of busy clusters to a same idle cluster.

It should be noted that, in another embodiment, the first node may not determine the corresponding target second cluster based on distribution of the hash value corresponding to the first cluster on the hash ring, but determines the corresponding target second cluster in a random allocation manner or a sequential allocation manner.

Specifically, the first node may randomly select one second cluster from a plurality of second clusters in the distributed system as the target second cluster.

Specifically, the at least one second cluster may be sorted, and the plurality of sub-clusters (including the first cluster) are sequentially mounted to the corresponding second cluster (in other words, an association relationship between each sub-cluster and the second cluster is established) in a preset sequence. In this case, the first node may alternatively determine the corresponding target second cluster in the foregoing manner.

It should be understood that, in an actual application, the foregoing implementation may not be limited. As long as the distributed system determines a fixed resource allocation relationship (the first node establishes an association relationship with a target second cluster) during resource borrowing relationship allocation, the method can be implemented. When the busy cluster borrows a resource, the busy cluster does not need to randomly send a resource query request sent to a selected idle cluster to borrow the resource after receiving a response, and can directly borrow the resource from the first cluster. This reduces delay overheads of one round-trip information. In addition, because a correspondence for resource borrowing is determined based on a correspondence that is on the hash ring generated based on a busy cluster and that is of the hash value of the first cluster, and the correspondence is unique, a resource of the idle cluster can be borrowed by only a corresponding busy cluster on the hash ring. Therefore, there is no borrowing conflict caused by concurrent borrowing of resources from a plurality of busy clusters to a same idle cluster.

Figure 5:
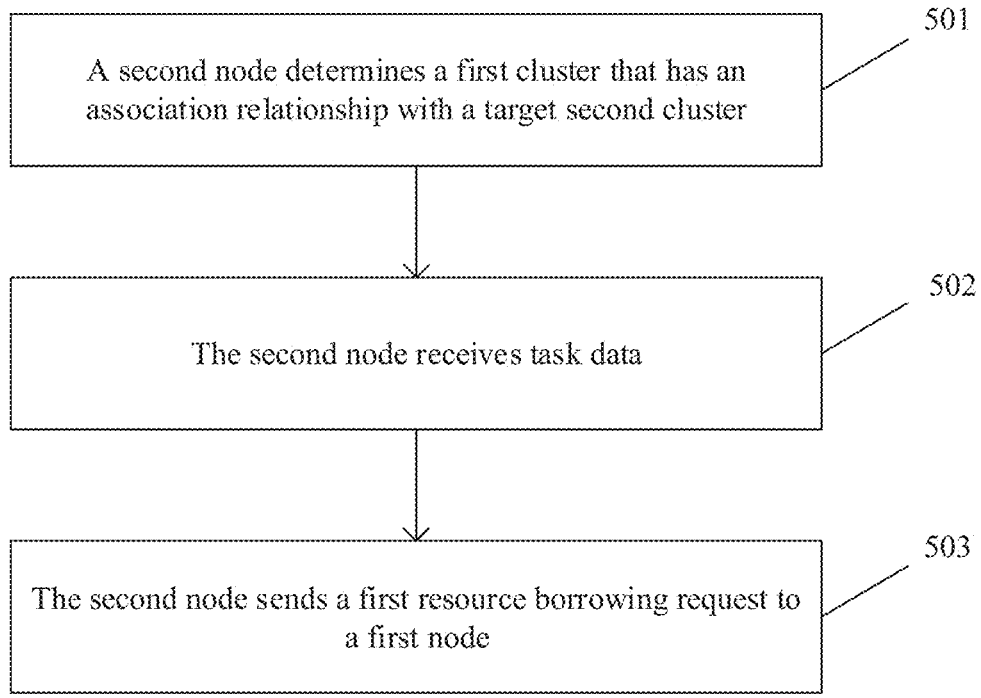
FIG. 5 is a schematic diagram of an embodiment of a resource borrowing method according to an embodiment of this application.

FIG. 5 is a schematic diagram of an embodiment of a resource borrowing method according to an embodiment of this application. As shown in FIG. 5, the resource borrowing method provided in this application includes the following steps.

501: A second node determines a first cluster that has an association relationship with a target second cluster, where the second node belongs to the target second cluster, the target second cluster corresponds to a target hash value interval in a hash ring, and a hash value corresponding to the first cluster belongs to the target hash value interval.

In this embodiment of this application, the second node belongs to the target second cluster, and the target second cluster is a busy cluster. Specifically, the second node may receive a resource allocation indication sent by the first node, where the resource allocation indication includes an identifier of the first cluster, and the resource allocation indication may indicate that the second node can borrow an idle resource of the first cluster. For how the first node sends the identifier of the first cluster to the target second cluster, refer to the foregoing embodiment. Details are not described herein again.

In this embodiment of this application, the second node may receive identifiers of a plurality of sub-clusters. In other words, there are a plurality of clusters that has the association relationship with the target second cluster.

In this embodiment, the second node may determine one of the plurality of clusters that have the association relationship with the target second cluster as the first cluster.

Optionally, in an embodiment, the second node may further receive an idle resource amount of each of the plurality of sub-clusters.

502: The second node receives task data.

In this embodiment of this application, the second node may receive the task data.

Optionally, in an embodiment, after receiving the task data, the second node may determine a required resource amount of the received task data, and determine an idle resource amount of an idle node in a busy cluster (the target second cluster) in which the second node is located. If the idle resource amount of the idle node in the busy cluster to which the second node belongs is greater than or equal to the required resource amount of the task data, it is equivalent to that the second node may determine that a local cluster has a sufficient idle resource amount to process the task data. If the idle resource amount of the idle node in the busy cluster to which the second node belongs is less than the required resource amount of the task data, it is equivalent to that the second node may determine that the local cluster does not have a sufficient idle resource amount to process the task data.

Specifically, if an idle CPU resource amount of the idle node in the busy cluster to which the second node belongs is greater than or equal to an idle CPU resource amount of the task data, and an idle memory resource amount of the idle node in the busy cluster to which the second node belongs is greater than or equal to an idle memory resource amount of the task data, it is equivalent to that the second node may determine that the local cluster has a sufficient idle resource amount to process the task data. If the idle CPU resource amount of the idle node in the busy cluster to which the second node belongs is less than the idle CPU resource amount of the task data, and the idle memory resource amount of the idle node in the busy cluster to which the second node belongs is less than the idle memory resource amount of the task data, it is equivalent to that the second node may determine that the local cluster does not have a sufficient idle resource amount to process the task data.

503: The second node sends a first resource borrowing request to the first node, where the first borrowing request is used to indicate the first node to allocate the task data to the first cluster for processing.

If the second node determines that the local cluster does not have a sufficient idle resource amount to process the task data, the second node needs to borrow a resource from another cluster to execute the task data.

In this embodiment of this application, the second node may send the first resource borrowing request to the first node, and the first borrowing request may include the task data and the identifier of the first cluster. Correspondingly, after receiving the first resource borrowing request, the first node may allocate the task data included in the first resource borrowing request to the first cluster for processing.

In an embodiment, the second node may receive the identifiers of the plurality of sub-clusters and idle resource amounts of the plurality of sub-clusters. In this case, the second node needs to determine, from the plurality of sub-clusters, one cluster as a resource borrowing object. The following describes how the second node determines, from the plurality of sub-clusters, the first cluster used as the resource borrowing object.

In this embodiment of this application, the second node may maintain a mapping table. The mapping table stores the identifiers of the plurality of sub-clusters and corresponding idle resource amounts. The second node may search the mapping table for a cluster set that is in the plurality of sub-clusters and whose idle resource amount is greater than or equal to the required resource amount of the task data, to obtain a sub-cluster set {slices 1, slices 2, . . . , and slices n} that meets the required resource amount. The slices n represents an identifier of an $n^{th}$ sub-cluster.

After obtaining the sub-cluster set {the slices 1, the slices 2, . . . , and the slices n}, the second node may perform priority sorting on the plurality of sub-clusters in the sub-cluster set, an indicator of priority sorting is an approximation degree between an idle resource amount of a sub-cluster and the required resource amount of the task data. A higher approximation degree indicates a higher priority of a corresponding sub-cluster, and the second node may select a sub-cluster with a highest priority to initiate the first borrowing request.

For example, the second node may maintain the following mapping table.

|  | Idle resource amount | |
| --- | --- | --- |
| Identifier of the first cluster | Idle CPU resource amount | Idle memory resource amount |
| slices 1 | 0.5 | 0.45 |
| slices 2 | 0.45 | 0.45 |

-continued

| Identifier of the first cluster | Idle resource amount | |
|---|---|---|
| | Idle CPU resource amount | Idle memory resource amount |
| slices 3 | 0.63 | 0.6 |
| slices 4 | 0.4 | 0.46 |
| slices 5 | 0.55 | 0.65 |
| slices 6 | 0.65 | 0.75 |
| slices 7 | 0.74 | 0.7 |
| slices 8 | 0.68 | 0.55 |
| slices 9 | 0.52 | 0.65 |

The second node receives the task data, and determines that a required CPU resource amount corresponding to the task data is 0.6, and a required memory resource amount corresponding to the task data is 0.65.

The second node may search the mapping table for a cluster set whose idle resource amount is greater than or equal to the required resource amount of the task data and that is in the plurality of first clusters, to obtain a first cluster set {slices 6, and slices 7} that meets the required resource amount.

The second node may determine, according to the following formula, the first cluster whose idle resource amount is closest to the required resource amount of the task data:

$$\min_i \alpha \times (cpi_i^b - cpu_j^r) + \beta \times (mem_i^b - mem_j^r)$$

$$\text{s.t.} \quad cpu_i^b \geq cpu_j^r$$
$$mem_i^b \geq mem_j^r,$$

where
$\alpha$ represents a weight parameter of a CPU, $\beta$ represents a weight parameter of a memory, $cpi_j^b$ represents an idle CPU resource amount of a first cluster i registered with a second cluster j, $cpu_j^r$ represents an idle CPU resource amount that is determined in the second cluster j and that is required by the task data, $mem_i^b$ represents an idle memory resource amount of the first cluster i registered with the second cluster j, and $mem_j^r$ represents an idle memory resource amount that is determined in the second cluster j and that is required by the task data. For example, $\alpha$ is 0.6, and $\beta$ is 0.4.

An approximate degree between the slices 6 and the requested resource amount of the task data resource requests is as follows:

$$(0.65 - 0.6) \times 0.6 + (0.75 - 0.65) \times 0.4 = 0.07$$

An approximate degree between the slices 7 and the requested resource amount of the task data resource requests is as follows:

$$(0.74 - 0.6) \times 0.6 + (0.7 - 0.65) \times 0.4 = 0.104$$

In this case, the second node may determine that an idle resource amount of the first cluster corresponding to the slices 6 is closest to the required resource amount of the task data, and initiate the first borrowing request to the first cluster corresponding to the slices 6.

It should be noted that the foregoing description is merely an example, and specific parameter selection is merely an example. This is not limited in this application.

In the foregoing manner, the second node determines that a cluster corresponding to the idle resource amount that is in the idle resource amounts of the plurality of clusters having the association relationship with the target second cluster and that has a minimum difference with the required resource amount of the task data is the first cluster. This improves resource utilization during resource borrowing.

Optionally, in an embodiment, the second node may determine, based on the received identifier that is of the first cluster and that is sent by the first node, that the first cluster is in a resource borrowable state.

The second node determines, based on sending a resource borrowing request to the first node, that the first cluster is in a resource non-borrowing state.

In this embodiment of this application, after the second node sends the resource borrowing request to the first node, it is equivalent to that the idle resource of the first cluster is occupied, and it may be determined that the first cluster is in the resource non-borrowing state. Optionally, the second node may mark, in a mapping table, that a resource borrowing state of the first cluster is the resource non-borrowing state. Correspondingly, the first node may also determine that the first cluster is in the resource non-borrowing state. In other words, the first node may determine that the first cluster cannot provide an available resource for another busy cluster. This ensures resource locking and implements cross-cluster resource scheduling without a conflict.

In this embodiment of this application, after processing the task data, the first cluster may return a processing result to the first node, and the first node sends the processing result to the second node.

In this embodiment of this application, the second node determines the first cluster that has the association relationship with the target second cluster, where the second node belongs to the target second cluster, the target second cluster corresponds to a target hash value interval in a hash ring, and a hash value corresponding to the first cluster belongs to the target hash value interval; the second node receives the task data: and the second node sends the first resource borrowing request to the first node, where the first resource borrowing request is used to indicate the first node to allocate the task data to the first cluster for processing. In the foregoing manner, on one hand, when there are a plurality of first clusters in the distributed system, each first node determines, by using distribution of the hash value corresponding to the first clusters on the hash ring generated based on a hash value corresponding to the second cluster, a target second cluster corresponding to the first cluster, and indicates that the target second cluster may borrow an idle resource of the first cluster. Distribution of the hash value corresponding to the first clusters on the hash ring that is according to a consistent hashing algorithm and a hash node corresponding to the second cluster are determined and relatively balanced. Therefore, when the target second cluster needs to borrow an idle resource of the first cluster, the target second cluster does not need to randomly send a resource query request to a selected idle cluster to borrow the resource after receiving a response, but can directly determine the first cluster from which the target second cluster needs to borrow the resource, and send the first resource borrowing request to the first node. This reduces delay overheads of one round-trip information. In addition, because a correspondence for resource borrowing is determined based on a correspondence that is on the hash ring generated based on a busy cluster and that is of the hash value of the first cluster, and the correspondence is unique, a resource of the idle cluster can be borrowed by only a corresponding busy cluster on the hash ring. Therefore, there is no borrowing conflict caused by concurrent borrowing of resources from a plurality of busy clusters to a same idle cluster.

Figure 6:
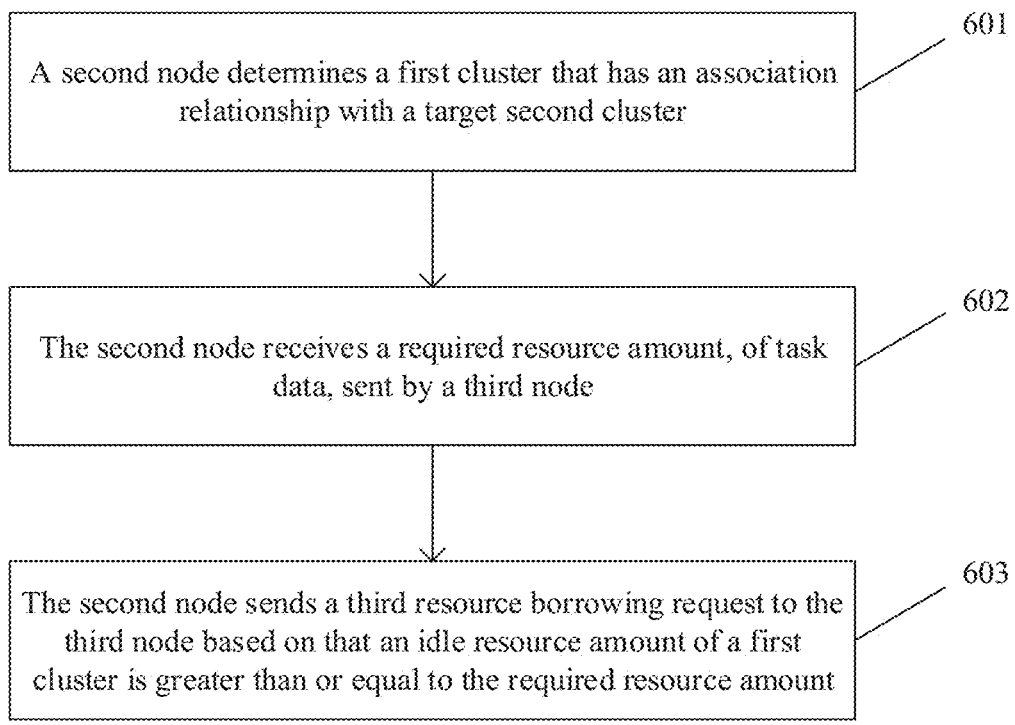
FIG. 6 is a schematic diagram of an embodiment of a resource borrowing method according to an embodiment of this application.

FIG. 6 is a schematic diagram of an embodiment of a resource borrowing method according to an embodiment of this application. As shown in FIG. 6, the resource borrowing method provided in this application includes the following steps.

601: A second node determines a first cluster that has an association relationship with a target second cluster, where the second node belongs to the target second cluster, the target second cluster corresponds to a target hash value interval in a hash ring, and a hash value corresponding to the first cluster belongs to the target hash value interval.

For a specific description of the step 601, refer to the specific description of the step 501 in the embodiment corresponding to FIG. 5. Details are not described herein again.

602: The second node receives a required resource amount, of task data, sent by a third node.

In this embodiment of this application, after receiving the task data, the third node may determine the required resource amount of the received task data, and determine an idle resource amount of an idle node in a busy cluster to which the third node belongs. If the idle resource amount of the idle node in the busy cluster to which the third node belongs is less than the required resource amount of the task data, the third node determines that a local cluster does not have a sufficient idle resource amount to process the task data.

In this case, the third node may traverse a mapping table that stores identifiers of a plurality of sub-clusters and a corresponding idle resource amount, and search the mapping table for a cluster set that is in the plurality of sub-clusters and in which an idle resource amount is greater than or equal to the required resource amount of the task data. If the third node determines that an idle resource amount of each of the plurality of sub-clusters is less than the required resource amount of the task data, or determines that all the plurality of sub-clusters are in a resource non-borrowing state, the third node needs to borrow a resource from another busy cluster.

Specifically, the third node may determine, in a first direction in a maintained hash ring, an adjacent successor node of the hash node corresponding to the third node. The adjacent successor node corresponds to the second cluster. The third node may send the required resource amount of the task data to a management node (a second node) of the second cluster. Specifically, the third node may send the required resource amount of the task data to the second node.

Optionally, in an embodiment, the third node may determine, in the first direction in the maintained hash ring, a plurality of subsequent nodes of the hash node corresponding to the third node, and the plurality of subsequent nodes correspond to a plurality of second clusters. The third node may send the required resource amount of the task data to a plurality of management nodes (second nodes) of the second cluster.

Correspondingly, the second node may receive the required resource amount, of the task data, sent by the third node

603: The second node sends a third resource borrowing request to the third node based on that an idle resource amount of the first cluster is greater than or equal to the required resource amount, where the third resource borrowing request is used to indicate that the third node is allowed to apply for a resource from the first cluster.

In this embodiment of this application, after receiving the required resource amount, the second node may search a mapping table maintained by the second node, determine a first cluster whose idle resource amount is greater than or equal to the required resource amount, and send the third resource borrowing request to the third node. The third resource borrowing request includes an identifier of the first cluster, and the third resource borrowing request is used to indicate that the third node is allowed to apply for a resource from the first cluster.

Optionally, in an embodiment, if the second node may determine that an idle resource amount of the plurality of sub-clusters is greater than or equal to the required resource amount, the second node may send identifiers of the plurality of determined sub-clusters to the third node. The first cluster is one of the plurality of sub-clusters.

Optionally, in an embodiment, the second node may determine that the idle resource amount of the plurality of sub-clusters is greater than or equal to the required resource amount, randomly select some sub-clusters from the plurality of determined sub-clusters, and send identifiers of some sub-clusters to the third node.

Optionally, in an embodiment, the second node may receive a second resource borrowing request sent by the third node. The second resource borrowing request includes the task data, and the second borrowing request is used to indicate the second node to allocate the task data to the first cluster for processing.

In this embodiment of this application, after receiving the identifier that is of the first cluster and that is sent by the second node, the third node obtains, from the second node, the identifier of the first cluster that can perform resource borrowing.

Optionally, in an embodiment, after receiving the identifiers that are of the plurality of sub-clusters and that are sent by a plurality of second nodes, or after receiving the identifiers that are of the plurality of sub-clusters and that are sent by one second node, the third node needs to determine one of the plurality of sub-clusters as a resource borrowing object, for how the third node determines one of a plurality of first clusters as the resource borrowing object, refer to the description of how the second node determines the first cluster of the plurality of sub-clusters as the resource borrowing object in the foregoing embodiment. Details are not described herein again.

If the third node determines that the first cluster in the plurality of sub-clusters is the resource borrowing object, correspondingly, the second node may receive the second resource borrowing request sent by the third node. The second resource borrowing request includes the task data and the identifier of the first cluster, and the second borrowing request is used to indicate the second node to allocate the task data to the first cluster for processing.

In this embodiment of this application, the second node may send the task data and the identifier of the first cluster to the first node.

The first node may allocate the task data to the first cluster for processing.

Optionally, in another embodiment, after receiving the third resource borrowing request sent by the second node, the third node may not send the second resource borrowing request to the second node to indicate the second node to allocate the task data to the first cluster for processing, but directly send a first resource borrowing request to the first node. The first borrowing request is used to indicate the first node to allocate the task data to the first cluster for processing. This reduces forwarding overheads of one step of information.

Figure 7:
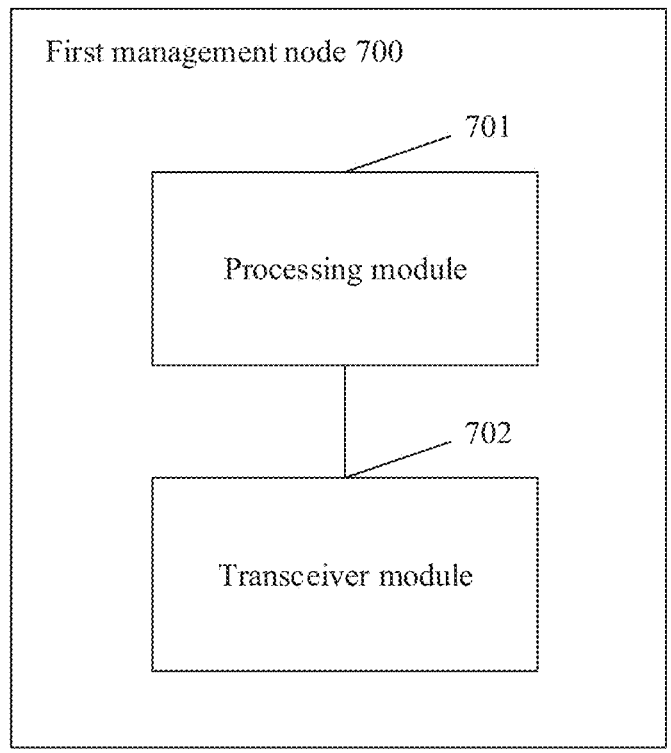
FIG. 7 is a schematic diagram of a structure of a first management node according to an embodiment of this application.

FIG. 7 is a schematic diagram of a structure of a first management node 700 according to an embodiment of this application. As shown in FIG. 7, the first management node 700 includes:
- a processing module 701, configured to: determine a hash value corresponding to a first cluster; obtain a hash ring, where the hash ring includes at least one hash value interval, and each hash value interval corresponds to one second cluster; and determine a corresponding target second cluster based on the hash value corresponding to the first cluster, where the hash value corresponding to the first cluster belongs to a target hash interval, the target hash interval is a hash value interval in the at least one hash value interval, and the target hash interval corresponds to the target second cluster; and
- a transceiver module 702, configured to establish an association relationship between the first cluster and the target second cluster, where the target second cluster that has the association relationship with the first cluster is allowed to apply for a resource from the first cluster.

Optionally, in an embodiment, the hash ring includes a first hash node and a second hash node, the first hash node corresponds to the target second cluster, the first hash node is an adjacent successor node of the second hash node on the hash ring, and the target hash interval is a hash interval between a hash value of the first hash node and a hash value of the second hash node.

Optionally, in an embodiment, the processing module 701 is further configured to divide an idle cluster including a plurality of computing nodes, to obtain a plurality of sub-clusters, where the first cluster is one of the plurality of sub-clusters.

Optionally, in an embodiment, the plurality of sub-clusters include a third sub-cluster and a fourth sub-cluster, the third sub-cluster is a sub-cluster having a maximum idle resource amount in the plurality of sub-clusters, the fourth sub-cluster is a cluster having a minimum idle resource amount in the plurality of sub-clusters, and an absolute value of a difference between the idle resource amount of the third sub-cluster and the idle resource amount of the fourth sub-cluster is less than a first threshold.

Optionally, in an embodiment, an absolute value of a difference between an idle resource amount of each of the plurality of sub-clusters and a preset idle resource amount is less than or equal to a second threshold, and the preset idle resource amount is related to a historical requested resource amount.

Optionally, in an embodiment, the transceiver module 702 is further configured to:
- receive a resource borrowing request sent by the target second cluster, where the resource borrowing request includes task data and an identifier of the first cluster; and
- send the task data to the first cluster based on the identifier of the first cluster.

Optionally, in an embodiment, the hash ring includes Y hash nodes, and each second cluster corresponds to at least one hash node, hash values corresponding to the Y hash nodes and the hash value corresponding to the first cluster are generated according to a same hash algorithm, and Y is a positive integer.

Optionally, in an embodiment, the processing module 701 is further configured to: determine Y hash values corresponding to X second clusters, where each second cluster corresponds to at least one hash value, X is a positive integer, and Y is a positive integer greater than or equal to X; and generate the hash ring based on the Y hash values, where the hash ring includes the Y hash nodes, each second cluster corresponds to the at least one hash node, the Y hash nodes divide the hash ring into Y hash value intervals, and each hash node corresponds to one hash value interval.

Optionally, in an embodiment, the transceiver module 702 is further configured to receive the hash ring sent by the second cluster.

Optionally, in an embodiment, the transceiver module 702 is further configured to send an idle resource amount of the first cluster to the target second cluster.

Figure 8:
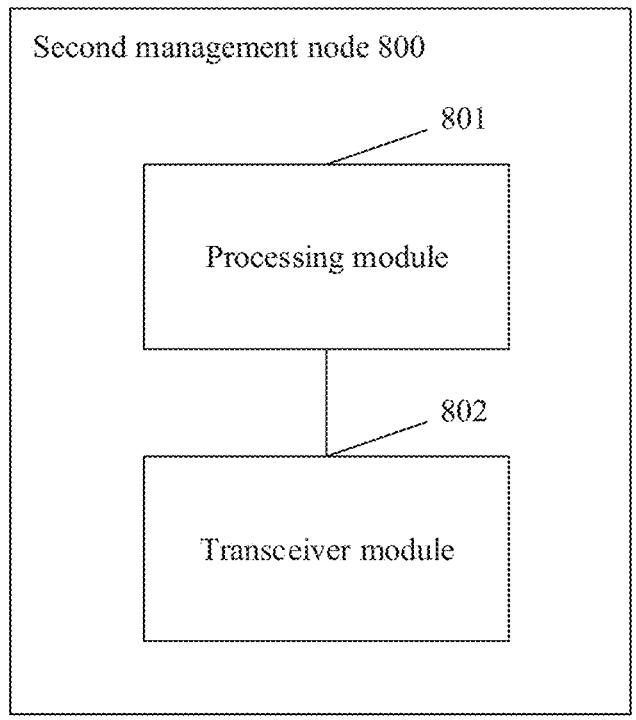
FIG. 8 is a schematic diagram of a structure of a second management node according to an embodiment of this application.

FIG. 8 is a schematic diagram of a structure of a second management node 800 according to an embodiment of this application. As shown in FIG. 8, the second management node 800 includes:
- a processing module 801, configured to determine a first cluster that has an association relationship with a target second cluster, where the second node belongs to the target second cluster, the target second cluster corresponds to a target hash value interval in a hash ring, and a hash value corresponding to the first cluster belongs to the target hash value interval; and
- a transceiver module 802, configured to receive task data, and send a first resource borrowing request to a first node, where the first resource borrowing request is used to indicate the first node to allocate the task data to the first cluster for processing.

Optionally, in an embodiment, the processing module 801 is further configured to: send a resource borrowing request to the first node based on the transceiver module, and determine that the first cluster is in a resource non-borrowing state.

Optionally, in an embodiment, there are a plurality of clusters that have the association relationship with the target second cluster, and the processing module 801 is specifically configured to determine one of the plurality of clusters that have the association relationship with the target second cluster as the first cluster.

Optionally, in an embodiment, the processing module 801 is specifically configured to determine that a cluster corresponding to an idle resource amount that is in idle resource amounts of the plurality of clusters having the association relationship with the target second cluster and that has a minimum difference with a required resource amount of the task data is the first cluster.

Optionally, in an embodiment, the transceiver module 802 is further configured to receive the required resource amount, of the task data, sent by a third node, and send an identifier of the first cluster and the idle resource amount of the first cluster to the third node based on that the idle resource amount of the first cluster is greater than or equal to the required resource amount.

Optionally, in an embodiment, the transceiver module 802 is specifically configured to receive a second resource borrowing request sent by the third node, where the second resource borrowing request includes the task data, and the second borrowing request is used to indicate the second node to allocate the task data to the first cluster for processing.

FIG. 8 is a schematic diagram of a structure of a second management node 800 according to an embodiment of this application. As shown in FIG. 8, the second management node 800 includes:

- a transceiver module 802, configured to receive a required resource amount, of task data, sent by a third node; and
- a processing module 801, configured to determine a first cluster that has an association relationship with a target second cluster, where the second node belongs to the target second cluster, the target second cluster corresponds to a target hash value interval in a hash ring, and a hash value corresponding to the first cluster belongs to the target hash value interval, where
- the transceiver module 802 is further configured to send a third resource borrowing request to the third node based on that an idle resource amount of the first cluster is greater than or equal to the required resource amount, where the third resource borrowing request is used to indicate that the third node is allowed to apply for a resource from the first cluster.

Optionally, in an embodiment, there are a plurality of clusters that have the association relationship with the target second cluster, and the processing module is specifically configured to determine one of the plurality of clusters that have the association relationship with the target second cluster as the first cluster.

Figure 9:
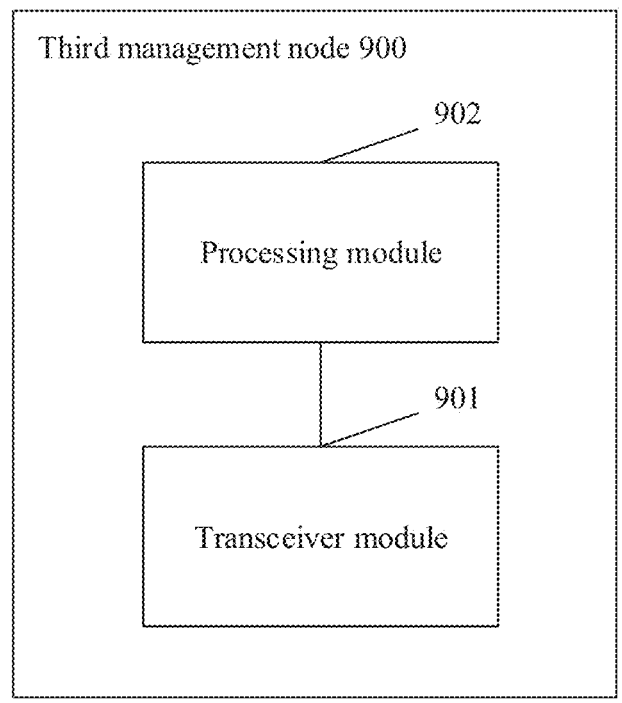
FIG. 9 is a schematic diagram of a structure of a third management node according to an embodiment of this application.

FIG. 9 is a schematic diagram of a structure of a third management node 900 according to an embodiment of this application. As shown in FIG. 9, the third management node 900 includes:

- a transceiver module 901, configured to: receive task data; send a required resource amount of the task data to a second node; receive a third resource borrowing request sent by the second node, where the third resource borrowing request is used to indicate that the third node is allowed to apply for a resource from a first cluster, the second node belongs to a target second cluster, the target second cluster corresponds to a target hash value interval in a hash ring, a hash value corresponding to the first cluster belongs to the target hash value interval, and an idle resource amount of the first cluster is greater than or equal to the required resource amount; and send a first resource borrowing request to a first node, where the first borrowing request is used to indicate the first node to allocate the task data to the first cluster for processing.

Optionally, in an embodiment, the transceiver module 901 is specifically configured to: send the required resource amount of the task data to a plurality of nodes, where the second node is one of the plurality of nodes; and receive third resource borrowing requests sent by the plurality of nodes, where the third resource borrowing request is used to indicate that the third node is allowed to apply for a resource from a plurality of sub-clusters, and the first cluster is one of the plurality of sub-clusters.

Optionally, in an embodiment, the third management node 900 further includes:

- a processing module 902, configured to determine that a sub-cluster corresponding to an idle resource amount that is in idle resource amounts of the plurality of sub-clusters and that has a minimum difference with the required resource amount of the task data is the first cluster.

Figure 10:
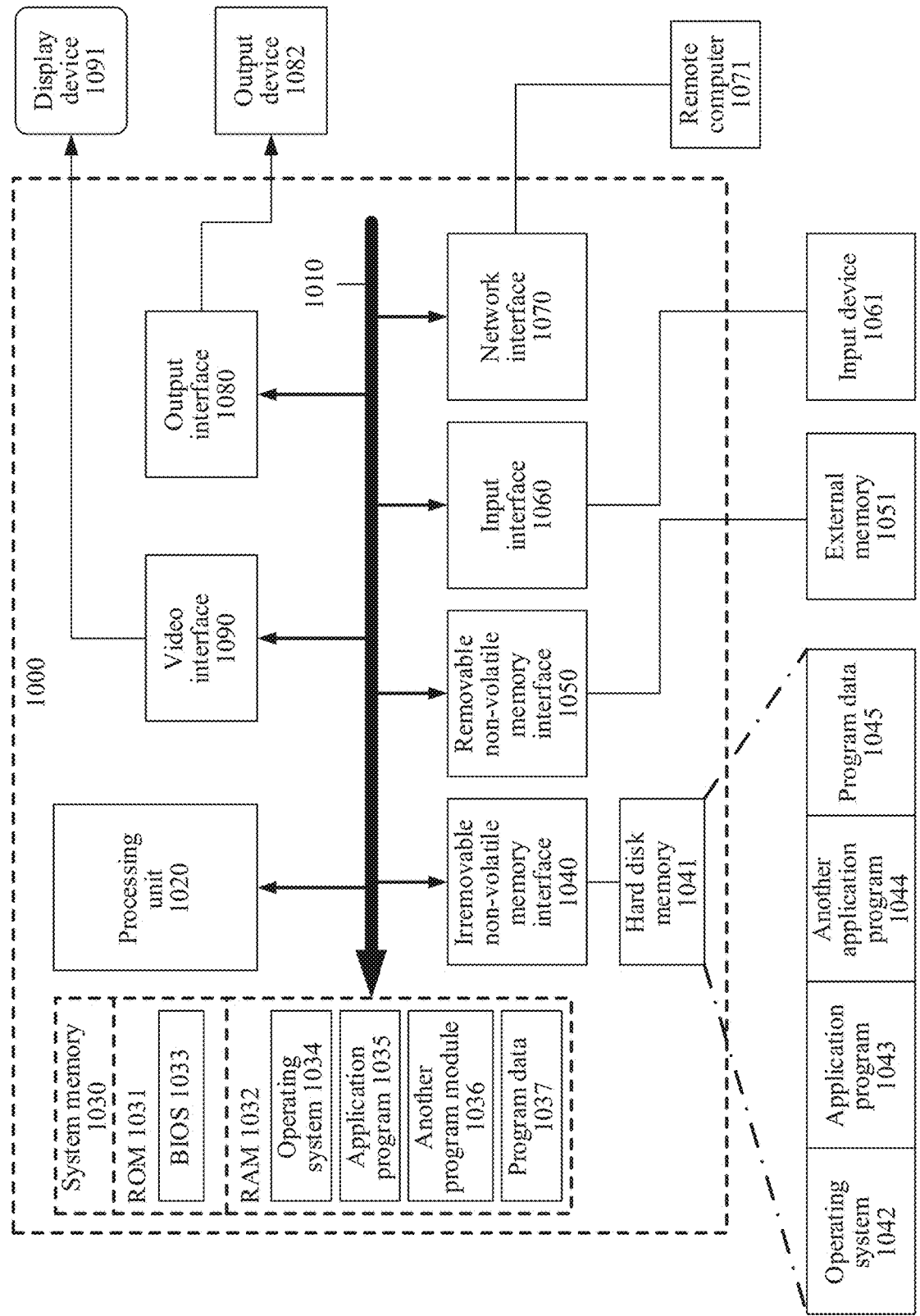
FIG. 10 is a system instance applicable to a management node according to an embodiment of the present invention.

FIG. 10 illustrates a system instance applicable to a management node according to an embodiment of the present invention. The management node may be any one of the first management node, the second management node, and the third management node described in the foregoing embodiments. Functions of logical modules of the management node in the foregoing embodiment can be implemented based on a system environment in this embodiment. This embodiment is an instance applicable to the present invention, and does not intend to exert any limitation on a function and structure of the management node provided in the present invention.

A general purpose computer system environment is used as an example in this embodiment of the present invention to describe the management node. It is well known that the management node may alternatively use another hardware architecture to implement a similar function. The another hardware architecture includes but is not limited to a personal computer, a serving computer, a multi-processor system, a microprocessor-based system, a programmable consumer electrical appliance, a network PC, a small-scale computer, a large-scale computer, or a distributed computing environment including any one of the foregoing systems or devices.

Referring to FIG. 10, the system used as an example to implement the present invention includes a general purpose computing device in a form of a management node 1000. With reference to the foregoing system scenario and architecture, the management node in this embodiment may execute the embodiment of the present invention described in the foregoing system scenario and architecture. For example, the management node may be a master node, a management node, or any node in a decentralized architecture.

Elements of the management node 1000 may include, but are not limited to, a processing unit 1020, a system memory 1030, and a system bus 1010. The system bus couples various system elements including the system memory with the processing unit 1020. The system bus 1010 may be any bus in a plurality of types of bus structures. These buses may include a memory bus or a memory controller, a peripheral bus, and a local bus that uses one bus structure. The bus structure may include an industry standard architecture (ISA) bus, a micro-channel architecture (MCA) bus, an extended ISA (EISA) bus, a video electronics standards association (VESA) local bus, and a peripheral component interconnect (PCI) bus.

The management node 1000 usually includes a plurality of types of management node readable media. The management node readable media may be any medium effectively accessible by the management node 1000, and include a volatile or non-volatile medium and a detachable or non-detachable medium. For example, the management node readable media may include but be not limited to a management node storage medium and a communications medium. Any method or technique for managing information about readable instructions, data structures, program modules, or other data of a management node. The management node storage medium includes but is not limited to a RAM, a ROM, an EEPROM, a flash memory, or another memory technology; or a hard disk storage, a solid-state hard disk storage, an optical disc storage, a magnetic disk cartridge, a magnetic disk storage, or another storage device; or any other media that can store required information and that is accessible by the management node 1000. The communications medium usually includes an embedded computer-readable instruction, a data structure, a program module, or other data in a modular data signal (for example, a carrier or another transmission mechanism), and further includes any information transmission medium. The term "modular data signal" refers to a signal that has one or more signal feature groups or that is changed by encoding information in a signal. For example, the communications medium includes but is not limited to a wired network or a wired medium based on a direct wired connection, and a wireless medium including a sound medium, an RF infrared, or another wireless medium. The foregoing combination may fall within a scope of the management node readable medium.

The system memory 1030 includes the management node storage medium, and may be a volatile memory or a non-volatile memory, for example, a read-only memory (ROM) 1031 and a random access memory (RAM) 1032. A basic input/output system 1033 (BIOS) is usually stored in the ROM 1031 and includes a basic routine. The basic routine contributes to information transmission between elements in a management node 1000. The RAM 1032 usually includes a data and/or program module, and can be accessed and/or operated immediately by the processing unit 1020. For example, but not limited to, FIG. 10 illustrates an operating system 1034, an application program 1035, another program module 1036, and program data 1037.

The management node 1000 may also include another detachable/non-detachable management node storage medium and another volatile/non-volatile management node storage medium. This is merely an example. FIG. 10 illustrates a hard disk memory 1041 which may be a non-detachable and non-volatile readable and writable magnetic medium, and illustrates an external memory 1051, which may be various removable and non-volatile external memories, such as an optical disc, a magnetic disk, a flash memory, or a removable hard disk. The hard disk memory 1041 is usually connected to the system bus 1010 through a non-detachable storage interface (for example, an interface 1040), and the external memory is usually connected to the system bus 1010 through a detachable storage interface (for example, an interface 1060). The external memory 1051 can be connected to the system bus 1010 through the removable non-volatile memory interface 1050. The remote computer 1071 can be connected to the system bus 1010 through the network interface 1070. The above-described driver shown in FIG. 10 and the management node storage medium related to the driver store the management node readable instruction, the data structure, the program module, and other data of the management node 1000. For example, the hard disk memory 1041 is configured to store an operating system 1042, an application program 1043, another application program 1044, and program data 1045. It should be noted that these components may be the same as or different from the operating system 1034, the application program 1035, the another program module 1036, and the program data 1037.

In this embodiment, the method in the foregoing embodiment or the function of the logical module in the foregoing embodiment may be performed by using code or a readable instruction stored in a storage medium of the management node, and the processing unit 1020 reads the code or the readable instruction, to execute the method.

A user may enter a command or information on the management node 1000 by using various input devices 1061. Various input devices are usually connected to the processing unit 1020 through the user input interface 1060, and the user input interface 1060 is coupled to the system bus. However, the various input devices may alternatively be connected to the bus structure through another interface, for example, a parallel interface, or a universal serial interface (USB). A display device 1091 may also be connected to the system bus 1010 through an interface (for example, the video interface 1090). In addition, the computing device 1000 may also include various peripheral output devices 1082, and the output devices 1082 may be connected through an output interface 1080 or the like. The management node 1000 may be logically connected to one or more computing devices, for example, a remote computer 1071. A remote computing node includes the management node, a computing node, a server, a router, a network PC, an equivalent device, or another universal network node, and usually includes numerous or all components that are discussed above and that are related to the management node 1000. In the architecture described in FIG. 1, the remote computing node may be a slave node, a computing node, or another management node. The logical connection described in FIG. 10 includes a local area network (LAN) and a wide area network (WAN), and may also include another network. Through the logical connection, the management node may implement interaction with other subjects in the present invention with other nodes. For example, task information and data may be transmitted through a logical connection to a user to obtain task data of the user; resource data and a task assignment command are transmitted through a logical connection to a computing node, to implement obtaining of resource information and allocation of the task data of each node.

Figure 11:
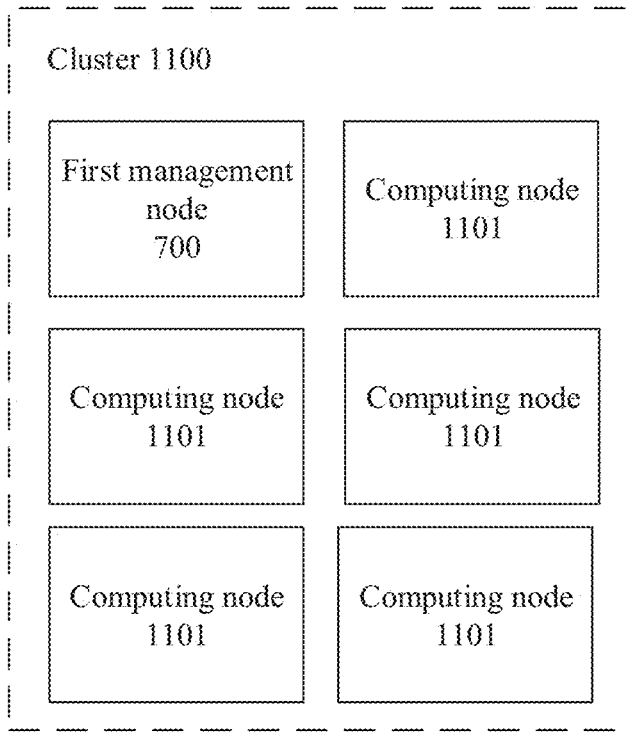
FIG. 11 is a schematic diagram of a structure of a cluster according to an embodiment of this application.

FIG. 11 is a schematic diagram of a structure of a cluster 1100 according to an embodiment of this application. As shown in FIG. 11, the cluster 1100 includes a plurality of computing nodes 1101, and the computing nodes 1101 provide a required resource for task data to execute the task data. The cluster 1100 further includes the first management node 700 described in the embodiment corresponding to FIG. 7.

Figure 12:
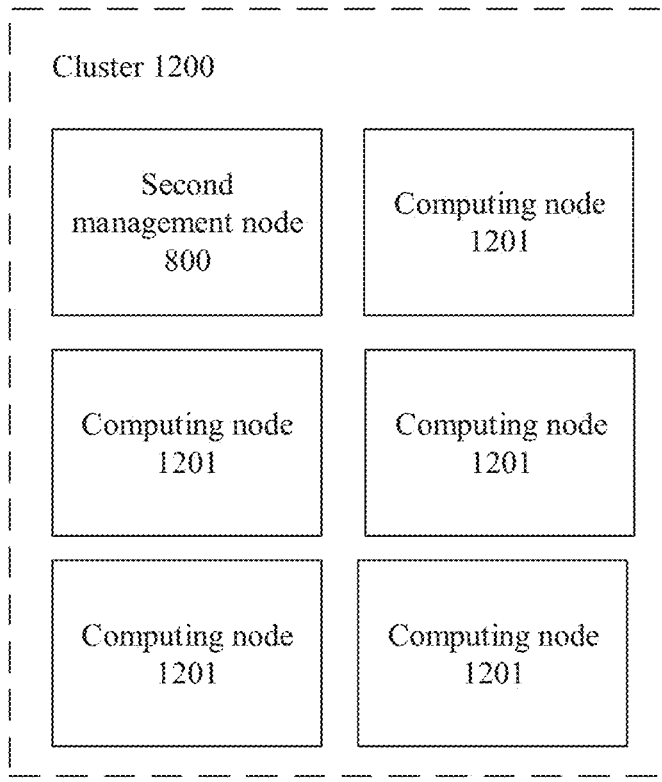
FIG. 12 is a schematic diagram of a structure of a cluster according to an embodiment of this application.

FIG. 12 is a schematic diagram of a structure of a cluster according to an embodiment of this application. As shown in FIG. 12, the cluster 1200 includes a plurality of computing nodes 1201, and the computing nodes 1201 provide a required resource for task data to execute the task data. The cluster 1200 further includes the second management node 800 described in the embodiment corresponding to FIG. 8.

Figure 13:
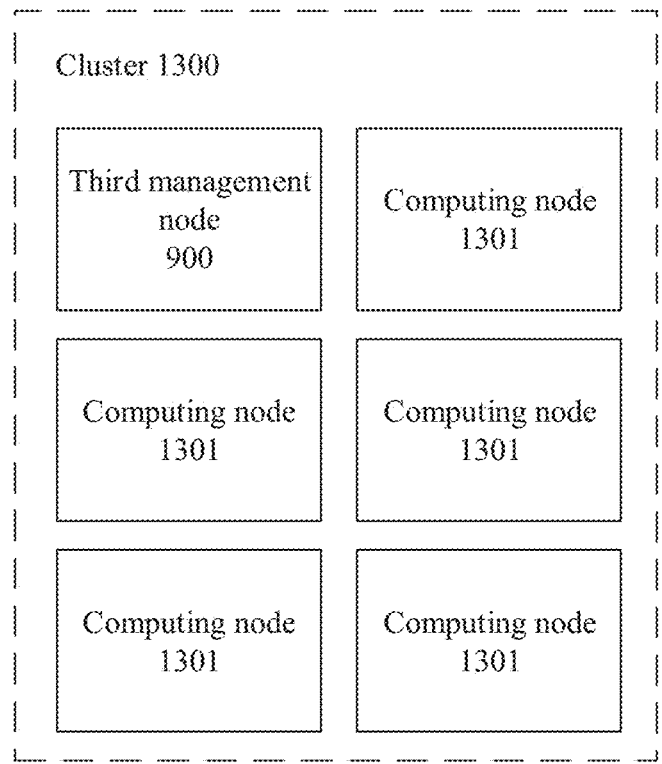
FIG. 13 is a schematic diagram of a structure of a cluster according to an embodiment of this application.

FIG. 13 is a schematic diagram of a structure of a cluster according to an embodiment of this application. As shown in FIG. 13, the cluster 1300 includes a plurality of computing nodes 1301, and the computing nodes 1301 provide a required resource for task data to execute the task data. The cluster 1300 further includes the third management node 900 described in the embodiment corresponding to FIG. 9.

Figure 14:
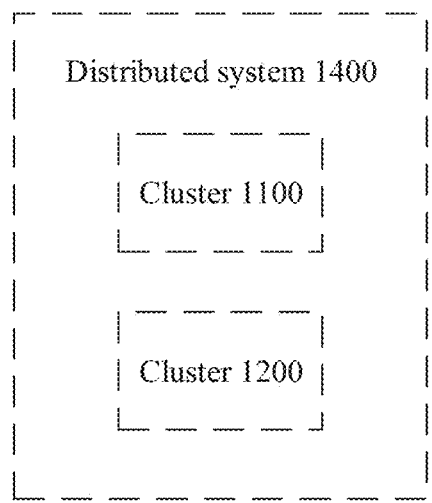
FIG. 14 is a schematic diagram of a structure of a distributed system according to an embodiment of this application.

FIG. 14 is a schematic diagram of a structure of a distributed system 1400 according to an embodiment of this application. As shown in FIG. 14, the distributed system 1400 includes the cluster 1100 described in the embodiment corresponding to FIG. 11 and the cluster 1200 described in the embodiment corresponding to FIG. 12.

Figure 15:
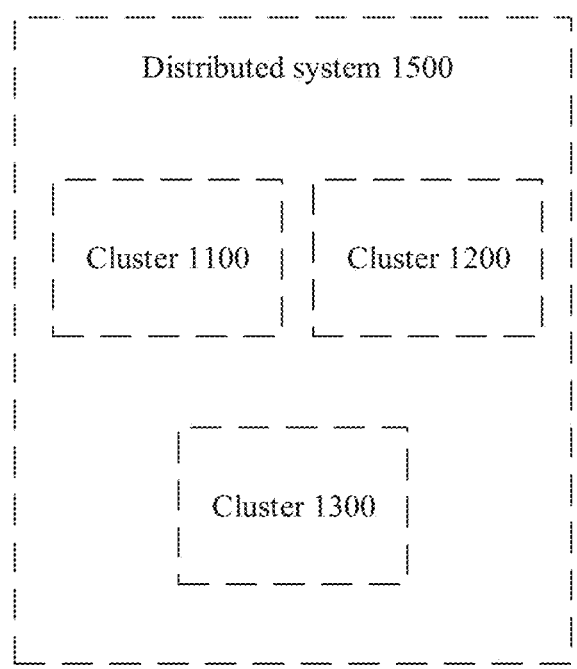
FIG. 15 is a schematic diagram of a structure of a distributed system according to an embodiment of this application.

FIG. 15 is a schematic diagram of a structure of a distributed system according to an embodiment of this application. As shown in FIG. 12, the distributed system 1500 includes the cluster 1100 described in the embodiment corresponding to FIG. 11, the cluster 1200 described in the embodiment corresponding to FIG. 12, and the cluster 1300 described in the embodiment corresponding to FIG. 13.

All or some of the foregoing embodiments may be implemented through software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of the present invention are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A resource allocation method, wherein the method comprises:
    determining, by a first node, a hash value corresponding to a first cluster;
    obtaining, by the first node, a hash ring, wherein the hash ring comprises at least one hash value interval, and each hash value interval corresponds to one second cluster;
    determining, by the first node, that the hash value corresponding to the first cluster belongs to a target hash value interval of the at least one hash value interval;
    determining, by the first node, a second cluster corresponding to the target hash value interval as a target second cluster;
    and
    establishing, by the first node, an association relationship between the first cluster and the target second cluster, wherein the target second cluster is allowed to apply for a resource from the first cluster.

2. The method according to claim 1, wherein the hash ring comprises a first hash node and a second hash node, the first hash node corresponds to the target second cluster, the first hash node is an adjacent successor node of the second hash node on the hash ring, and the target hash value interval is between a hash value of the first hash node and a hash value of the second hash node.

3. The method according to claim 1 wherein the method further comprises:
    dividing, by the first node, an idle cluster comprising a plurality of computing nodes to obtain a plurality of sub-clusters, wherein the first cluster is one of the plurality of sub-clusters.

4. The method according to claim 3, wherein the plurality of sub-clusters comprise a third sub-cluster and a fourth sub-cluster, the third sub-cluster has a maximum idle resource amount in the plurality of sub-clusters, the fourth sub-cluster has a minimum idle resource amount in the plurality of sub-clusters, and an absolute value of a difference between an idle resource amount of the third sub-cluster and an idle resource amount of the fourth sub-cluster is less than a first threshold.

5. The method according to claim 3, wherein an absolute value of a difference between an idle resource amount of each of the plurality of sub-clusters and a preset idle resource amount is less than or equal to a second threshold, and the preset idle resource amount is related to a historical requested resource amount.

6. The method according to claim 1, wherein the method further comprises:
- receiving, by the first node, a first resource borrowing request sent by the target second cluster, wherein the first resource borrowing request comprises task data and an identifier of the first cluster; and
- sending, by the first node, the task data to the first cluster based on the identifier of the first cluster.

7. The method according to claim 1, wherein the hash ring comprises Y hash nodes, each second cluster corresponds to at least one hash node, hash values corresponding to the Y hash nodes and the hash value corresponding to the first cluster are generated according to a same hash algorithm, and Y is a positive integer.

8. The method according to claim 1, wherein obtaining, by the first node, the hash ring comprises:
- determining, by the first node, Y hash values corresponding to X second clusters, wherein each second cluster corresponds to at least one hash value, X is a positive integer, and Y is a positive integer greater than or equal to X; and
- generating, by the first node, the hash ring based on the Y hash values, wherein the hash ring comprises Y hash nodes, each second cluster corresponds to at least one hash node, the Y hash nodes divide the hash ring into Y hash value intervals, and each hash node corresponds to one hash value interval.

9. An apparatus for resource allocation, wherein the apparatus comprises:
- at least one processor; and
- one or more memories coupled to the at least one processor and storing programming instructions for execution by the at least one processor to:
  - determine a hash value corresponding to a first cluster;
  - obtain a hash ring, wherein the hash ring comprises at least one hash value interval, and each hash value interval corresponds to one second cluster;
  - determine that the hash value corresponding to the first cluster belongs to a target hash value interval of the at least one hash value interval;
  - determine a second cluster corresponding to the target hash value interval as a target second cluster; and
  - establish an association relationship between the first cluster and the target second cluster, wherein the target second cluster is allowed to apply for a resource from the first cluster.

10. The apparatus according to claim 9, wherein the hash ring comprises a first hash node and a second hash node, the first hash node corresponds to the target second cluster, the first hash node is an adjacent successor node of the second hash node on the hash ring, and the target hash value interval is between a hash value of the first hash node and a hash value of the second hash node.

11. The apparatus according to claim 9, wherein the programming instructions are for execution by the at least one processor to:
- divide an idle cluster comprising a plurality of computing nodes to obtain a plurality of sub-clusters, wherein the first cluster is one of the plurality of sub-clusters.

12. The apparatus according to claim 11, wherein the plurality of sub-clusters comprise a third sub-cluster and a fourth sub-cluster, the third sub-cluster has a maximum idle resource amount in the plurality of sub-clusters, the fourth sub-cluster has a minimum idle resource amount in the plurality of sub-clusters, and an absolute value of a difference between an idle resource amount of the third sub-cluster and an idle resource amount of the fourth sub-cluster is less than a first threshold.

13. A computer-readable storage medium storing a program, wherein the program comprises instructions, and when the instructions are executed by a computer, cause the computer to perform operations comprising:
- determining a hash value corresponding to a first cluster;
- obtaining a hash ring, wherein the hash ring comprises at least one hash value interval, and each hash value interval corresponds to one second cluster;
- determining that the hash value corresponding to the first cluster belongs to a target hash value interval of the at least one hash value interval;
- determining a second cluster corresponding to the target hash value interval as a target second cluster; and
- establishing an association relationship between the first cluster and the target second cluster, wherein the target second cluster is allowed to apply for a resource from the first cluster.

14. The computer-readable storage medium according to claim 13, wherein the hash ring comprises a first hash node and a second hash node, the first hash node corresponds to the target second cluster, the first hash node is an adjacent successor node of the second hash node on the hash ring, and the target hash value interval is between a hash value of the first hash node and a hash value of the second hash node.

15. The computer-readable storage medium according to claim 13, wherein the operations further comprise:
- dividing an idle cluster comprising a plurality of computing nodes to obtain a plurality of sub-clusters, wherein the first cluster is one of the plurality of sub-clusters.

16. The computer-readable storage medium according to claim 15, wherein the plurality of sub-clusters comprise a third sub-cluster and a fourth sub-cluster, the third sub-cluster has a maximum idle resource amount in the plurality of sub-clusters, the fourth sub-cluster has a minimum idle resource amount in the plurality of sub-clusters, and an absolute value of a difference between an idle resource amount of the third sub-cluster and an idle resource amount of the fourth sub-cluster is less than a first threshold.

17. The computer-readable storage medium according to claim 15, wherein an absolute value of a difference between an idle resource amount of each of the plurality of sub-clusters and a preset idle resource amount is less than or equal to a second threshold, and the preset idle resource amount is related to a historical requested resource amount.

* * * * *